(12) United States Patent
Park et al.

(10) Patent No.: US 11,812,092 B2
(45) Date of Patent: *Nov. 7, 2023

(54) DISPLAY APPARATUS AND CONTROL METHOD THEREOF

(71) Applicant: SAMSUNG ELECTRONICS CO., LTD., Suwon-si (KR)

(72) Inventors: Jae-Sung Park, Suwon-si (KR); Byung Seok Min, Suwon-si (KR); Jong Wook Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/981,720

(22) Filed: Nov. 7, 2022

(65) Prior Publication Data

US 2023/0055281 A1 Feb. 23, 2023

Related U.S. Application Data

(63) Continuation of application No. 17/343,045, filed on Jun. 9, 2021, now Pat. No. 11,516,536, which is a
(Continued)

(30) Foreign Application Priority Data

Jan. 8, 2019 (KR) .................. 10-2019-0002201

(51) Int. Cl.
*H04N 21/431* (2011.01)
*G06F 3/044* (2006.01)
(Continued)

(52) U.S. Cl.
CPC ......... *H04N 21/4312* (2013.01); *G06F 3/044* (2013.01); *G06F 3/1446* (2013.01); *H04N 21/47214* (2013.01)

(58) Field of Classification Search
CPC .......... H04N 21/4312; H04N 21/47214; G06F 3/044; G06F 3/1446
(Continued)

(56) References Cited

U.S. PATENT DOCUMENTS 6,483,485 B1  11/2002  Huang et al.
6,558,006 B2   5/2003  Ioka
(Continued)

FOREIGN PATENT DOCUMENTS

CN    106415477 A    2/2017
EP      3023860 A1   5/2016
(Continued)

OTHER PUBLICATIONS

Communication dated Nov. 25, 2021 by the European Patent Office for European Patent Application No. 20150348.9.
(Continued)

*Primary Examiner* — Prabodh M Dharia
(74) *Attorney, Agent, or Firm* — Sughrue Mion, PLLC

(57) ABSTRACT

A display apparatus capable of correcting an image quality change caused by long-term use is provided. The display apparatus includes: a display panel; a communicator configured to communicate with a service apparatus; and a controller configured to control the communicator to transmit operation information including a total operating time of the display apparatus and an operating temperature of the display apparatus, to the service apparatus; receive an image parameter from the service apparatus through the communicator, and based on the received image parameter data; process image data; and transmit the processed image to the display panel. The image parameter may include at least one of a brightness level, a contrast, a sharpness level, and a color density of the display panel.

11 Claims, 20 Drawing Sheets

Related U.S. Application Data continuation of application No. 16/732,403, filed on Jan. 2, 2020, now Pat. No. 11,057,666.

(51) Int. Cl.
*G06F 3/14* (2006.01)
*H04N 21/472* (2011.01)

(58) Field of Classification Search
USPC .......... 345/1.2, 8, 173, 589; 348/46; 725/81
See application file for complete search history.

(56) References Cited

U.S. PATENT DOCUMENTS

| | | | |
|---|---|---|---|
| 7,283,139 B1* | 10/2007 | Tanaka | G09G 5/02 |
| | | | 345/589 |
| 7,768,496 B2 | 8/2010 | Daly | |
| 8,384,965 B2 | 2/2013 | Matsuda | |
| 8,994,757 B2 | 3/2015 | Surati et al. | |
| 9,049,410 B2 | 6/2015 | Botzas et al. | |
| 10,133,932 B2 | 11/2018 | Sato et al. | |
| 2004/0168109 A1 | 8/2004 | Ogura | |
| 2005/0259064 A1 | 11/2005 | Sugino et al. | |
| 2006/0218248 A1 | 9/2006 | Shiina | |
| 2009/0284476 A1 | 11/2009 | Bull et al. | |
| 2010/0156897 A1 | 6/2010 | Blumenthal et al. | |
| 2012/0075362 A1 | 3/2012 | Ichioka et al. | |
| 2013/0127980 A1 | 5/2013 | Haddick et al. | |
| 2014/0168186 A1 | 6/2014 | Kang et al. | |
| 2015/0015459 A1* | 1/2015 | Cho | H04M 1/724 |
| | | | 345/8 |
| 2015/0020122 A1* | 1/2015 | Shin | H04N 21/26258 |
| | | | 725/81 |
| 2015/0022098 A1 | 1/2015 | Knapp | |
| 2015/0102109 A1* | 4/2015 | Huck | G06K 7/109 |
| | | | 235/462.14 |
| 2015/0242178 A1* | 8/2015 | Cho | G09G 3/20 |
| | | | 345/1.2 |
| 2015/0279324 A1 | 10/2015 | Ohta et al. | |
| 2015/0346987 A1* | 12/2015 | Ren | G09G 3/3406 |
| | | | 345/589 |
| 2015/0381963 A1* | 12/2015 | Dal Mutto | H04N 13/239 |
| | | | 348/46 |
| 2016/0103477 A1 | 4/2016 | Park et al. | |
| 2016/0119743 A1 | 4/2016 | Oh | |
| 2016/0247306 A1 | 8/2016 | Jang et al. | |
| 2016/0335965 A1* | 11/2016 | Huang | G09G 3/3208 |
| 2017/0032723 A1 | 2/2017 | Kim et al. | |
| 2017/0124709 A1 | 5/2017 | Rithe et al. | |
| 2017/0132991 A1* | 5/2017 | Hwang | G06F 16/9554 |
| 2019/0197929 A1 | 6/2019 | Hsieh et al. | |
| 2019/0279345 A1* | 9/2019 | Kim | G06T 5/20 |
| 2019/0340421 A1 | 11/2019 | Boenapalli et al. | |
| 2021/0149618 A1* | 5/2021 | Lee | G06F 3/16 |
| 2022/0201185 A1 | 6/2022 | Ding et al. | |

FOREIGN PATENT DOCUMENTS

| | | |
|---|---|---|
| JP | 3974629 B2 | 9/2007 |
| JP | 2013-512473 A | 4/2013 |
| KR | 10-2016-0030652 A | 3/2016 |
| KR | 10-2017-0026975 A | 3/2017 |
| KR | 10-1711597 B1 | 3/2017 |
| WO | 2016182681 A1 | 11/2016 |

OTHER PUBLICATIONS

Communication dated Jun. 24, 2022 by the State Intellectual Property Office of P.R. China in counterpart Chinese Patent Application No. 202010019771.0.
Communication dated Aug. 10, 2020, from the European Patent Office in counterpart European Application No. 20150348.9.
Communication dated Jan. 4, 2023, issued by the China National Intellectual Property Administration in counterpart Chinese Application No. 202010019771.0.
Communication dated May 17, 2023 by the Korean Intellectual Property Office for Korean Patent Application No. 10-2019-0002201.
Communication dated Aug. 3, 2023 by the European Patent Office for European Patent Application No. 20150348.9.

* cited by examiner

DISPLAY APPARATUS AND CONTROL METHOD THEREOF

CROSS-REFERENCE TO RELATED APPLICATION(S)

This application is a continuation of U.S. patent application Ser. No. 17/343,045, filed on Jun. 9, 2021 in the U.S. Patent and Trademark Office, which is a continuation of U.S. patent application Ser. No. 16/732,403, filed on Jan. 2, 2020 in the U.S. Patent and Trademark Office, and issued as U.S. Pat. No. 11,057,666 on Jul. 6, 2021, which is based on and claims priority under 35 U.S.C. § 119 to Korean Patent Application No. 10-2019-0002201, filed on Jan. 8, 2019 in the Korean Intellectual Property Office, the disclosures of which are incorporated by reference herein in their entireties.

BACKGROUND

1. Field

The disclosure relates to a display apparatus and a control method thereof, and more particularly, to a display apparatus capable of correcting an image quality degradation caused by long-term use, and a control method of the display apparatus.

2. Description of the Related Art

A display apparatus is an output apparatus for visually displaying received or stored image information to a user. The display apparatus is widely used in various settings, such as home, places of business, etc.

Some examples of display apparatuses are a monitor connected to a personal computer (PC), a server computer or the like, a portable computer, a navigation terminal, a television, an Internet Protocol Television (IPTV), a handy terminal (for example, a smart phone, a tablet PC, Personal Digital Assistant (PDA), or a cellular phone), various kinds of displays used to reproduce images of advertisements or movies in industrial fields, and various kinds of audio/video systems.

The display apparatuses display images using various kinds of display panels. For example, the display panels may include a Light Emitting Diode (LED) panel, an Organic Light Emitting Diode (OLED) panel, a Liquid Crystal Display (LCD) panel, etc.

The display apparatuses deteriorate in performance over time from the date of manufacture and prolonged use by a user. For example, when a display apparatus is used over a long time, the intensity (e.g., brightness) of light output from the display apparatus may be reduced. Furthermore, when a display apparatus is used over a long time, colors of images that are displayed on the display apparatus may also change.

SUMMARY

Therefore, it is an aspect of the disclosure to provide a display apparatus capable of correcting an image quality deterioration caused by long-term use.

It is another aspect of the disclosure to provide a display apparatus capable of correcting both an image deterioration caused by long-term use and an image change caused by short-term use.

It is another aspect of the disclosure to provide a display apparatus capable of measuring a change of a displayed image and correcting the change of the image based on the measured change of the image.

Additional aspects of the disclosure will be set forth in part in the following description and, in part, will be obvious from the description, or may be learned by practice of the disclosure.

According to an embodiment, there is provided a display apparatus including a display panel; a communicator configured to communicate with a service apparatus; and a controller. The controller may be configured to control the communicator to transmit operation information including a total operating time of the display apparatus and an operating temperature of the display apparatus, to the service apparatus; receive an image parameter from the service apparatus through the communicator, and based on the received image parameter data; process image data; and transmit the processed image to the display panel. The image parameter may include at least one of a brightness level, a contrast, a sharpness level, and a color density of the display panel.

The controller may be further configured to control the communicator to transmit environment information including a geographic location of the display apparatus and an illuminance outside the display apparatus, to the service apparatus.

The display apparatus may further include a user inputter configured to acquire a user input, and the controller may be further configured to control the communicator to transmit the operation information to the service apparatus based on acquiring a user input for powering off the display apparatus from the user inputter.

The display apparatus may further include a user inputter configured to acquire a user input, and the controller may be further configured to: determine whether the total operating time of the display apparatus is longer than or equal to a first predetermined time based on acquiring a user input for powering off the display apparatus from the user inputter, and based on determining that the total operating time of the display apparatus is longer than or equal to the first predetermined time, control the communicator to transmit the operation information to the service apparatus.

The display panel may include a liquid crystal panel and a backlight unit, and the controller may be further configured to correct a driving current to be supplied to the backlight unit when an operating time elapses a second predetermined time after the display apparatus is powered on.

According to another embodiment, there is provided a display system including a display apparatus configured to display an image based on an image parameter, transmit operation information including a total operating time and an operating temperature of the display apparatus, to a service apparatus; and the service apparatus configured to, based on the received total operating time and the operating temperature of the display apparatus, output update data for updating the image parameter for correcting degradation in image quality of the display apparatus. The image parameter may include at least one of a brightness level, a contrast, a sharpness level, and a color density of the display apparatus.

The service apparatus may include a communication interface configured to communicate with the display apparatus; a database including an image parameter for correcting the degradation in image quality of the display apparatus; and a processor configured to receive the operation information from the display apparatus through the communication interface, and transmit the image parameter for correcting the degradation in image quality of the display apparatus, to the display apparatus through the communication interface.

The display apparatus may include a display panel; a first communicator configured to communicate with the service apparatus; and a first controller configured to process image data based on the image parameter, and transfer the processed image data to the display panel. The first controller may be further configured to control the first communicator to transmit the operation information to the service apparatus, and process the image data based on the image parameter received from the service apparatus through the first communicator.

The first controller may be further configured to control the first communicator to transmit environment information including a geographic location of the display apparatus and an illuminance outside the display apparatus, to the service apparatus.

The display apparatus may further include a user inputter configured to acquire a user input, and the first controller may be further configured to control the first communicator to transmit the operation information to the service apparatus based on acquiring a user input for powering off the display apparatus from the user inputter.

The display apparatus may further include a user inputter configured to acquire a user input, and the first controller may be further configured to: determine whether the total operating time of the display apparatus is longer than or equal to a first predetermined time based on acquiring a user input for powering off the display apparatus from the user inputter, and based on determining that the total operating time of the display panel is longer than or equal to the first predetermined time, control the first communicator to transmit the operation information to the service apparatus.

The display system may further include a user apparatus configured to communicate with the display apparatus and the service apparatus, where the user apparatus may be further configured to transmit, in response to acquiring a user input for correcting degradation in image quality of the display apparatus, the user input to the display apparatus, and the display apparatus may display a predetermined image in response to receiving the user input from the user apparatus.

The predetermined image may include a plurality of areas having different colors, brightness levels, and color densities.

The user apparatus may include a camera; a second communicator configured to communicate with the display apparatus and the service apparatus; a second controller configured to control the camera to photograph the display apparatus displaying the predetermined image, and control the second communicator to transmit the predetermined image of the display apparatus to the service apparatus.

The user apparatus may further include a display, and the second controller may be further configured to control the display to display the predetermined image of the display apparatus and a plurality of guide lines, and control the camera to record the predetermined image of the display apparatus based on the predetermined image of the display apparatus being positioned within the plurality of guide lines.

The service apparatus may include a communication interface configured to communicate with the user apparatus; a database including an image parameter for correcting the degradation in image quality of the predetermined image displayed on the display apparatus; and a processor configured to receive the predetermined image of the display apparatus from the user apparatus through the communication interface, and transmit the image parameter for correcting the degradation in image quality of the display apparatus to the display apparatus through the communication interface.

The user apparatus may include a camera; a second communicator configured to communicate with the display apparatus and the service apparatus; and a second controller configured to control the camera to photograph the display apparatus displaying the predetermined image, collect image information from the plurality of areas included in the predetermined image of the display apparatus, and control the second communicator to transmit the image information to the service apparatus.

The image information may include information about colors, brightness levels, and color densities of the plurality of areas.

The service apparatus may include a communication interface configured to communicate with the user apparatus; a database including an image parameter for correcting the degradation in image quality of the display apparatus based on the image information of the display apparatus; and a processor configured to receive the image information from the user apparatus, and transmit the image parameter for correcting the degradation in image quality of the display apparatus to the user apparatus.

According to another embodiment, there is provided a method of controlling a display apparatus, including collecting operation information including a total operating time of the display apparatus and an operating temperature of the display apparatus; transmitting the operation information to a service apparatus; receiving, from the service apparatus, an image parameter for correcting degradation of image quality of the display apparatus; processing image data based on the received image parameter; and displaying an image corresponding to the processed image data, where the image parameter may include at least one of a brightness level, a contrast, a sharpness level, and a color density of the display apparatus.

According to still another embodiment, there is provided a display system including a display apparatus; and a service apparatus, wherein the display apparatus is configured to: display an image based on an image parameter, transmit, to the service apparatus, operation information including a total operating time and an operating temperature of the display apparatus, and wherein the service apparatus is configured to: based on the received total operating time and the operating temperature of the display apparatus, generate update data for updating the image parameter of the display apparatus and transmit the update data to the display apparatus.

BRIEF DESCRIPTION OF THE DRAWINGS

The above and/or other aspects, features, and advantages of certain embodiments of the disclosure will become apparent from the following description of the embodiments, taken in conjunction with the accompanying drawings, in which.

DETAILED DESCRIPTION

The following detailed description is provided to assist one of ordinary skill in the art to understand the disclosure, but various changes, modifications, and equivalents of the methods, apparatuses, and/or systems described herein may be apparent to those of ordinary skill in the art. The progression of operations described is merely an example. The sequence of operations is not limited to the sequence set forth herein and may be changed or modified as necessitated, with the exception of operations necessarily occurring in a particular order. In addition, respective descriptions of well-known functions and constructions may be omitted for clarity and conciseness.

Embodiments will now be described in more detail hereinafter with reference to the accompanying drawings. The embodiments may, however, be embodied in many different forms and should not be construed as being limited to the embodiments set forth herein. These embodiments are provided so that the disclosure is more thorough and complete, and to fully convey the embodiments to those of ordinary skill in the art.

It may be understood that, although the terms first, second, etc. may be used herein to describe various elements, these elements should not be limited by these terms. These terms are only used to distinguish one element from another. As used herein, the term "and/or," may include any and all combinations of one or more of the associated listed items.

It will be understood that when an element is referred to as being "connected," or "coupled," to another element, it may be directly connected or coupled to the other element or intervening elements may be present. In contrast, when an element is referred to as being "directly connected," or "directly coupled," to another element, there may not be intervening elements.

The terminology used herein is for the purpose of describing particular embodiments only and is not intended to be limiting. As used herein, the singular forms "a," "an," and "the," may include plural forms, unless the context clearly indicates otherwise.

Throughout the disclosure, the expression "at least one of a, b or c" indicates only a, only b, only c, both a and b, both a and c, both b and c, all of a, b, and c, or variations thereof.

Hereinafter, the operation principle and embodiments of the disclosure will be described in detail with reference to the accompanying drawings.

Figure 1:
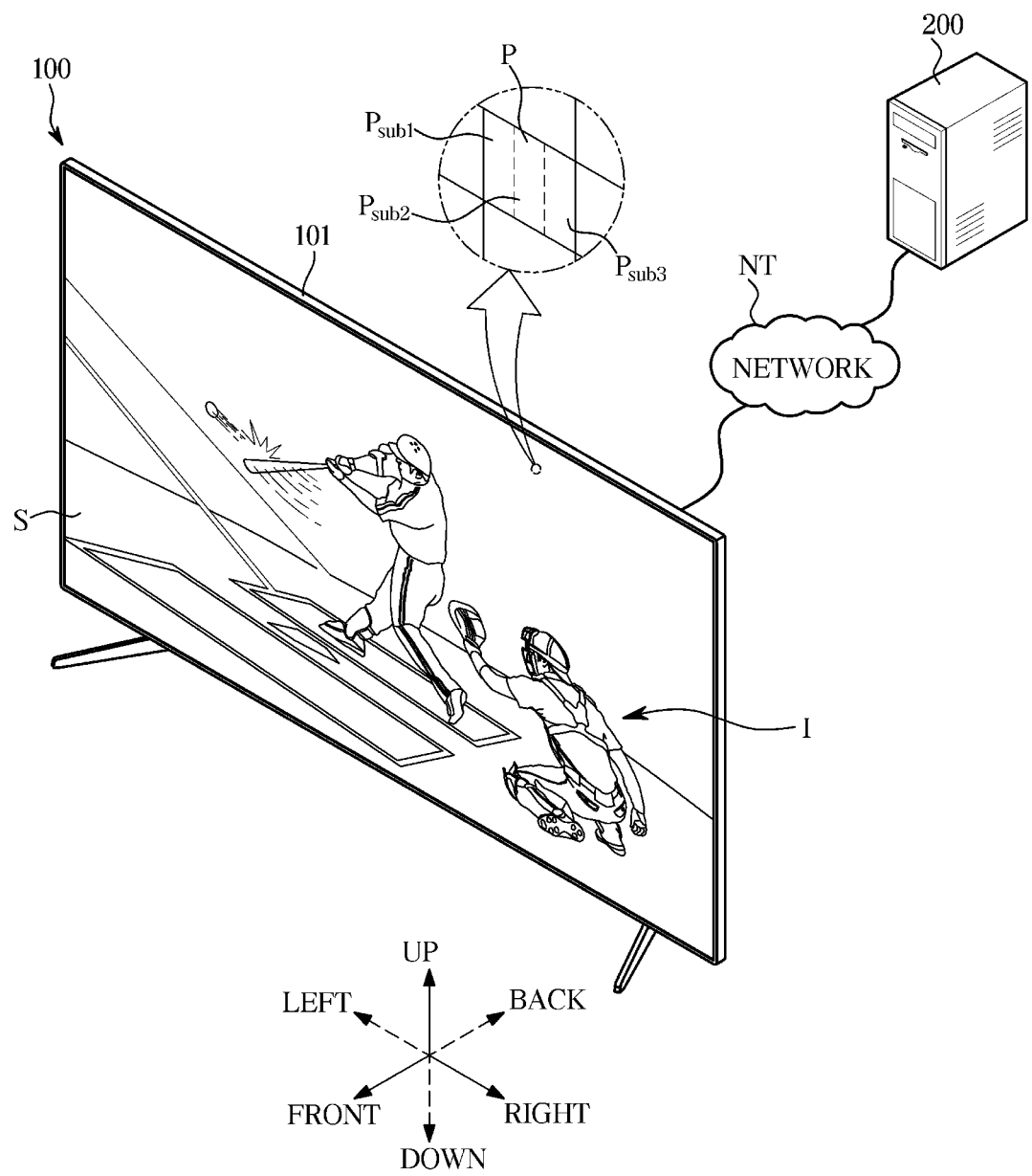
FIG. 1 shows a service apparatus and a display apparatus according to an embodiment.

FIG. 1 shows a service apparatus and a display apparatus according to an embodiment.

As shown in FIG. 1, a display apparatus 100 may be connected to a service apparatus 200 in a wired or wireless manner through a network NT.

The display apparatus 100 may process an image signal received from outside to display an image corresponding to the image signal. Hereinafter, the display apparatus 100 is assumed to be a television (TV). However, the display apparatus 100 may be implemented as one of various apparatuses, such as a monitor, a portable multimedia apparatus, a portable communication apparatus, a portable computing apparatus, etc. That is, a kind of the display apparatus 100 is not limited as long as the display apparatus 100 is capable of visually displaying images.

Also, the display apparatus 100 may be a large format display (LFD) that may be installed in an outdoor space, such as the top of building or a bus stop. The outdoor space is not limited to an open-air space, and the display apparatus 100 may be installed in any place where many people are present, such as a subway station, a shopping mall, a theater, an office, a store, etc., even if the place is an indoor space.

The display apparatus 100 may receive video data and an audio signal from various content sources, and output video and audio corresponding to the video data and the audio signal. For example, the display apparatus 100 may receive television broadcasting content through a broadcasting reception antenna or a wired cable, receive content from a content reproducing apparatus, or receive content from a content providing server of a content provider.

The display apparatus 100 may include a main body 101 accommodating a plurality of components for displaying images, and a screen S provided on one side of the main body 101 to display an image I.

The main body 101 may form an outer appearance of the display apparatus 100, and inside of the main body 101, the components for enabling the display apparatus 100 to display an image I may be installed. The main body 101 shown in FIG. 1 is in the shape of a flat plate, however, a shape of the main body 101 is not limited to the shape shown in FIG. 1. For example, the main body 101 may be in the shape of a curved plate of which left and right sides protrude frontward and a center portion is a concave.

The screen S may be formed on a front side of the main body 101, and an image I, which is visual information, may be displayed on the screen S.

The screen S may include a plurality of pixels P, and an image I displayed on the screen S may be formed by a combination of light emitted from the pixels P. For example, light emitted from the pixels P may be combined like a mosaic to form an image I on the screen S.

Each of the pixels P may emit light of various brightness levels and various colors.

To emit light of various brightness levels, each pixel P may include a component (for example, an organic light emitting diode) capable of emitting light by itself or a component (for example, a liquid crystal panel (LCD)) capable of transmitting or blocking light emitted from a backlight unit.

To emit light of various colors, each pixel P may include a plurality of sub pixels $P_{sub1}$, $P_{sub2}$, and $P_{sub3}$. For example, the sub pixels $P_{sub1}$, $P_{sub2}$, and $P_{sub3}$ may include a red sub pixel capable of emitting red light, a green sub pixel capable of emitting green light, and a blue sub pixel capable of emitting blue light (collectively, RGB pixels). As another example, each pixel P may include a red sub pixel, a green sub pixel, a blue sub pixel, and a white sub pixel capable of emitting white light (collectively, RGBW pixels). As another example, each pixel P may include a red sub pixel, a green sub pixel, a blue sub pixel, and a yellow sub pixel capable of emitting yellow light (collectively, RGBY pixels).

However, sub pixel structures are not limited to the above-described structures, and may include other various sub pixel structures that are known or may be known in future.

The display apparatus 100 may include various types of display panels capable of displaying an image I. For example, the display apparatus 100 may include a liquid crystal display (LCD) panel, a light emitting diode (LED) panel, or an organic light emitting diode (OLED) panel.

Hereinafter, as an example of the display apparatus 100, a display apparatus including a LCD panel will be described.

A network NT may include wired and wireless networks. The wired network may include a cable network or a telephone network based on Ethernet (IEEE 802.3 standard), or the Internet. The wireless network may be based on Wi-Fi (WiFi™ IEEE 802.11 standard), Bluetooth (Bluetooth™, IEEE 802.15.1 standard), or Zigbee (Zigbee™, IEEE 802.15.4 standard). Also, the wireless network may include a mobile communication service network, such as Time Division Multiple Access (TDMA), Code Division Multiple Access (CDMA), Wideband Code Division Multiple Access (WCDMA), Code Division Multiple Access 2000 (CDMA2000), Wireless Broadband (Wibro), World Interoperability for Microwave Access (WiMAX), Long Term Evolution (LTE), Wireless Broadband Evolution (Wibro Evolution), etc. However, the network NT is not limited to the above-mentioned examples, and may include a network of a communication service that may be implemented in future.

For example, the network NT may include an access point (AP). The display apparatus 100 may access the AP by using a short-range wireless communication standard, and the AP may access the Internet through a wired network provided by an Internet service provider. The short-range wireless communication may include a communication method, such as Wi-Fi, Bluetooth, Zigbee, Infrared communication, Ultra Wide Band (UWB) communication, etc. Also, the AP may be replaced by a hub, a router, a switch, a gateway, etc.

The service apparatus 200 may be operated by a manufacturer, a seller, or a service agent of the display apparatus 100.

The service apparatus 200 may include a database storing data related to image quality changes that are caused by long-term use of the display apparatus 100 and parameters for correcting the image quality changes that are caused by long-term use of the display apparatus 100.

The service apparatus 200 may receive operation information and environment information from the display apparatus 100 through the network NT, and determine a degree of an image quality change caused by long-term use of the display apparatus 100, based on the operation information and environment information of the display apparatus 100. Also, the service apparatus 200 may output a parameter for correcting an image quality change caused by long-term use of the display apparatus 100.

The service apparatus 200 may operate as a cloud server. For example, the service apparatus 200 may receive a request from the display apparatus 100 on the web, and provide the display apparatus 100 with a parameter for correcting an image quality change caused by long-term use of the display apparatus 100 in response to the request from the display apparatus 100.

However, the service apparatus 200 is not limited to a cloud server. For example, the network NT may be omitted, and the display apparatus 100 may be connected directly to the service apparatus 200. When the display apparatus 100 is connected directly to the service apparatus 200, the service apparatus 200 may be a peripheral device of the display apparatus 100, such as a desktop computer, a laptop computer, etc.

Figure 2:
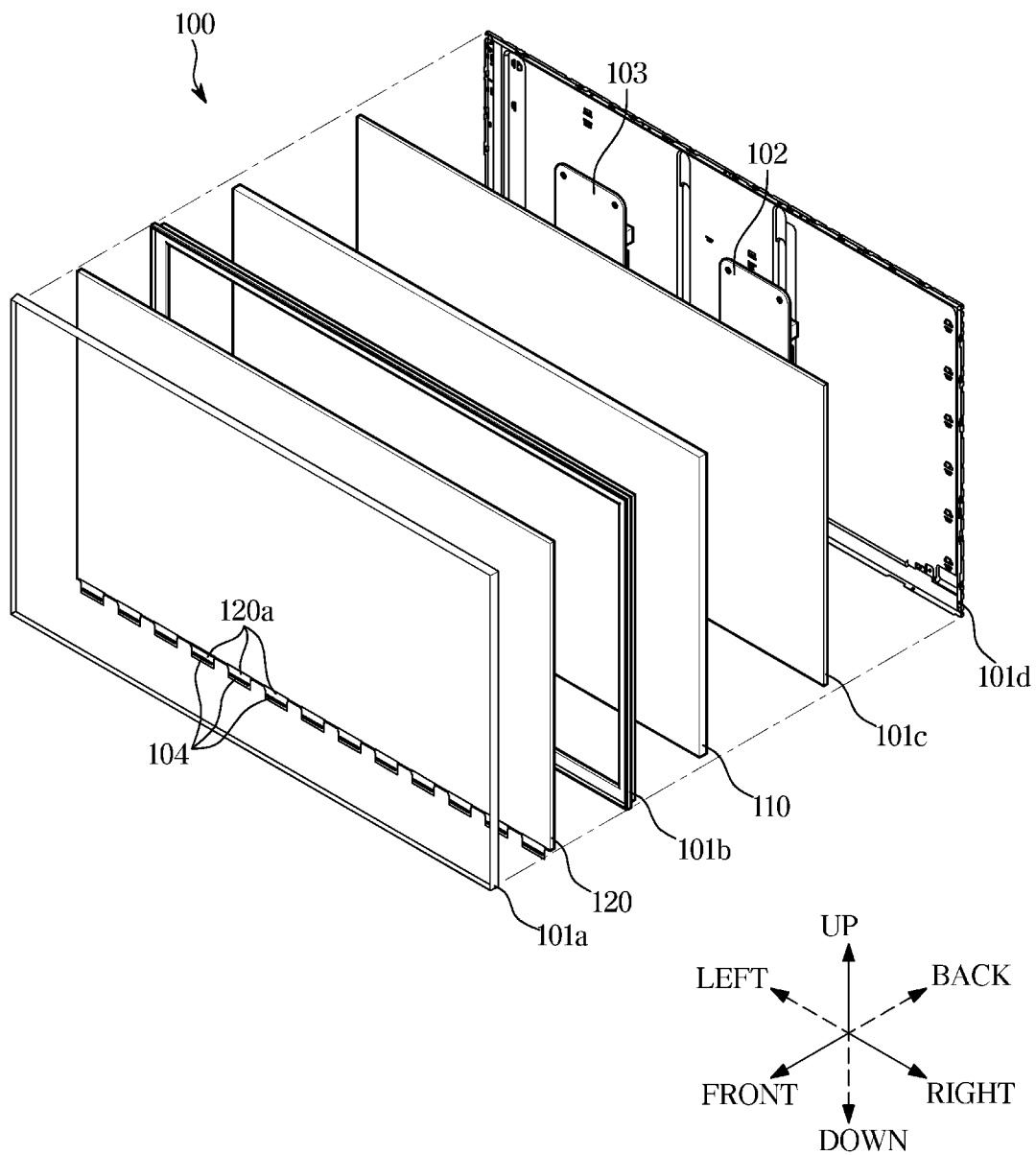
FIG. 2 is an exploded perspective view of a display apparatus according to an embodiment.
Figure 3:
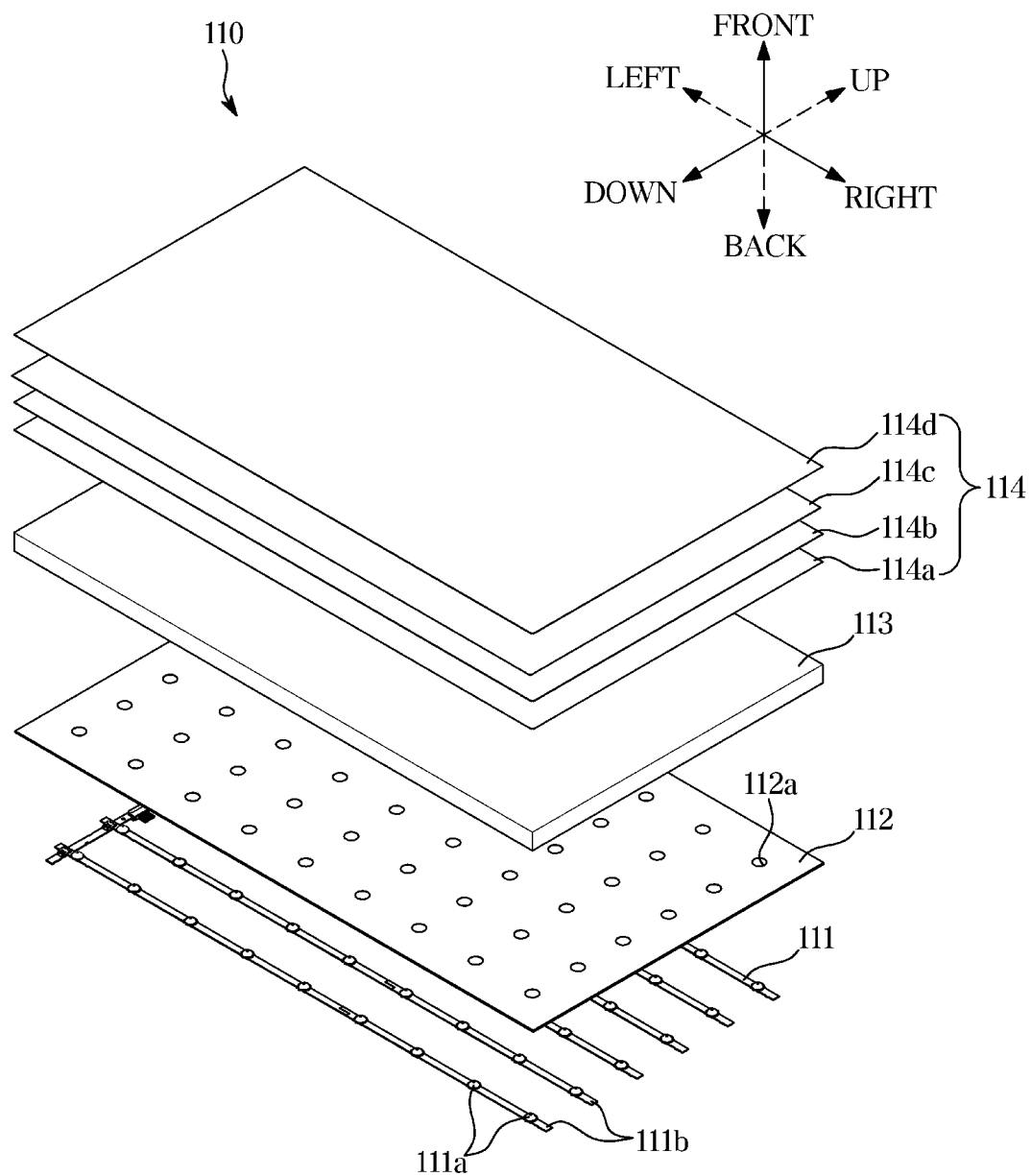
FIG. 3 shows an example of a backlight unit included in a display apparatus according to an embodiment.
Figure 4:
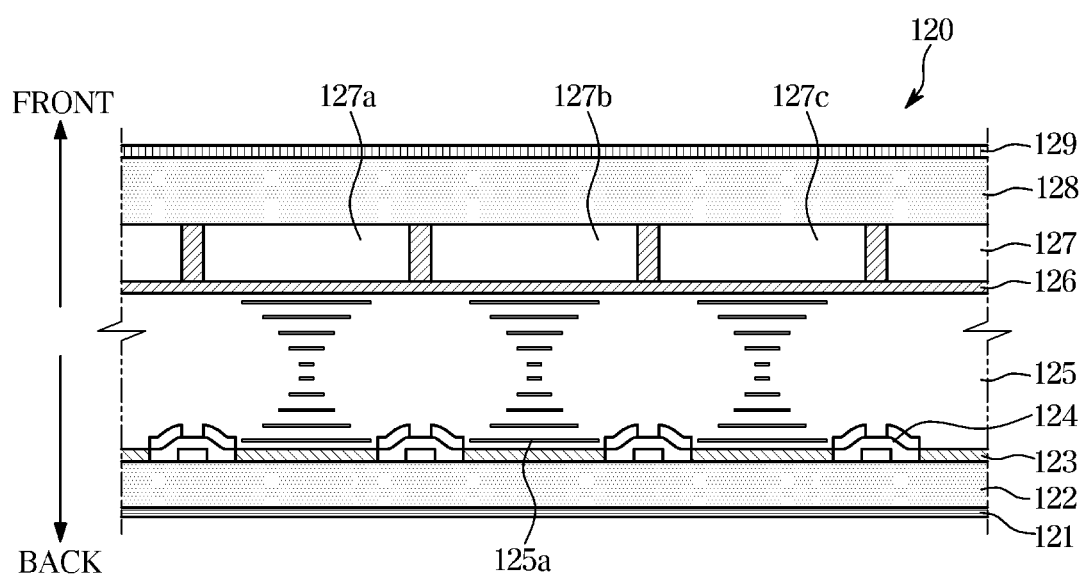
FIG. 4 shows an example of a liquid crystal panel included in a display apparatus according to an embodiment.

FIG. 2 is an exploded perspective view of the display apparatus according to an embodiment. FIG. 3 shows an example of a backlight unit included in the display apparatus according to an embodiment. FIG. 4 shows an example of a liquid crystal panel included in the display apparatus according to an embodiment.

As shown in FIG. 2, various components for creating an image I on the screen S may be installed in the main body 101.

For example, the main body 101 may include a backlight unit 110 for emitting surface light in a front direction, a liquid crystal panel 120 for blocking or transmitting light emitted from the backlight unit 110, a control assembly 102 for controlling operations of the backlight unit 110 and the liquid crystal panel 120, and a power supply assembly 103 for supplying power to the backlight unit 110 and the liquid crystal panel 120. Also, the main body 101 may further include a bezel 101a, a middle mold frame 101b, a bottom chassis 101c, and a rear cover 101d for supporting the liquid crystal panel 120, the backlight unit 110, the control assembly 102, and the power supply assembly 103.

The backlight unit 110 may include a point light source for emitting monochromatic light or white light, and may refract, reflect, and scatter light to convert light emitted from the point light source into uniform surface light.

For example, as shown in FIG. 3, the backlight unit 110 may include a light-emitting module 111 for generating light, a reflective sheet 112 for reflecting light, a diffuser plate 113 for diffusing light, and an optical sheet 114 for improving brightness.

The light-emitting module 111 may include a plurality of light sources 111a for emitting light, and a support 111b for supporting/fixing the light sources 111a.

The light sources 111a may be arranged uniformly and emit light toward the front direction. The light sources 111a may be arranged in a predetermined pattern such that light emitted from the light sources 111a have uniform brightness. More specifically, the light sources 111a may be arranged such that distances between the light sources are constant or equal.

Each light source 111a may be capable of emitting, when current is supplied or a voltage is applied, monochromatic light (light having a predetermined wavelength, for example, blue light) or white light (mixed light of light having a plurality of wavelengths) in various directions. For example, the light source 111a may include a LED with a small amount of heat generation.

The support 111b may fix the light sources 111a such that positions of the light sources 111a do not change. Also, the support 111b may supply power to the light sources 111a to emit light. The support 111b may be made of a synthetic resin forming a conductive power supply line for fixing the light sources 111a and supplying power to the light sources 111a, or may be implemented as a printed circuit board (PCB).

The reflective sheet 112 may reflect light travelling forward from the light sources 111a or light reflected backward from the diffuser plate 113. The reflective sheet 112 may reflect light travelling backward from the diffuser plate 113 so that the light travels toward the front direction or substantially in the front direction.

In the reflective sheet 112, a plurality of through holes 112a may be formed to correspond to each of the light sources 111a of the light-emitting module 111. The light emitted from light sources 111a of the light-emitting module 111 may pass through the through holes 112a to travel toward the front direction of the reflective sheet 112. Thereby, the light sources 111a may emit light in the front direction of the reflective sheet 112.

The diffuser plate 113 may be positioned in front of the light-emitting module 111 and the reflective sheet 112, and uniformly diffuse light emitted from the light sources 111a of the light-emitting module 111.

Although the light sources 111a are arranged at equidistant intervals on a rear surface of the backlight unit 110, brightness non-uniformity may occur over the entire of the backlight unit 110 according to the positions of the light sources 111a.

The diffuser plate 113 may diffuse light emitted from the light sources 111a to remove brightness non-uniformity caused by the light sources 111a. In other words, non-uniform light from the light sources 111a may be incident to the diffuser plate 113, and uniform light may be emitted from a front surface of the diffuser plate 113.

The optical sheet 114 may include various sheets to improve brightness of the backlight unit 110 and enhance brightness uniformity. For example, the optical sheet 114 may include a diffuser sheet 114a, a first prism sheet 114b, a second prism sheet 114c, and a reflective polarizing sheet 114d.

The liquid crystal panel 120 may be positioned in front of the backlight unit 110, and block or transmit light emitted from the backlight unit 110 to form an image I.

A front surface of the liquid crystal panel 120 may form the screen S of the display apparatus 100 as described above, and may include the plurality of pixels P. The pixels P included in the liquid crystal panel 120 may block or transmit light emitted from the backlight unit 110, independently, and light transmitted through the pixels P may form an image I that is displayed on the screen S.

For example, as shown in FIG. 4, the liquid crystal panel 120 may include a first polarizing film 121, a first transparent substrate 122, a pixel electrode 123, a thin-film transistor 124, a liquid crystal layer 125, a common electrode 126, a color filter 127, a second transparent substrate 128, and a second polarizing film 129.

The first transparent substrate 122 and the second transparent substrate 128 may fix and support the pixel electrode 123, the thin-film transistor 124, the liquid crystal layer 125, the common electrode 126, and the color filter 127. The first and second transparent substrates 122 and 128 may be made of tempered glass or a transparent resin.

On outer surfaces of the first transparent substrate 122 and the second transparent substrate 128, the first polarizing film 121 and the second polarizing film 129 may be disposed, respectively.

Each of the first polarizing film 121 and the second polarizing film 129 may transmit predetermined light and block the other light. For example, the first polarizing film 121 may transmit first polarized light and block the other light. Also, the second polarizing film 129 may transmit second polarized light and block the other light. A first polarization direction of the first polarized light may be orthogonal to a second polarization direction of the second polarized light.

On an inner side of the second transparent substrate 128, that is, behind the second transparent substrate 128, the color filter 127 may be disposed.

The color filter 127 may include a first filter 127a, a second filter 127b, and a third filter 127c, and the first filter 127a, the second filter 127b, and the third filter 127c may be arranged adjacent to one another.

An area where the color filter 127 is formed may correspond to the pixels P described above. More specifically, an area where the first filter 127a is formed may correspond to the first sub pixel $P_{sub1}$, an area where the second filter 127b is formed may correspond to the second sub pixel $P_{sub2}$, and an area where the third filter 127c is formed may correspond to the third sub pixel $P_{sub3}$.

On the inner side of the second transparent substrate 128, the thin-film transistor 124 may be disposed. Based on turning-on (close) or turning-off (open) the thin-film transistor 114, an electric field may be formed between the pixel electrode 123 and the common electrode 126, or an electric field formed between the pixel electrode 123 and the common electrode 126 may be removed.

In front of the first transparent substrate 122, the pixel electrode 123 may be disposed, and behind the second transparent substrate 128, the common electrode 126 may be disposed. More specifically, the pixel electrode 123 may be disposed on an upper surface of the first transparent substrate 122 and the common electrode 126 may be disposed on a lower surface of the color filter 127.

The pixel electrode 123 and the common electrode 126 may be made of an electrically conductive metal material, and may form an electric field for changing alignment of liquid crystal molecules 125a constituting the liquid crystal layer 125.

Between the pixel electrode 123 and the common electrode 126, the liquid crystal layer 125 may be formed, and the liquid crystal layer 125 may be filled with the liquid crystal modules 125a.

Liquid crystal has an intermediate state between a solid (crystal) state and a liquid state. The liquid crystal may show an optical property according to a change in electric field.

For example, the direction of the molecular arrangement of liquid crystal may change according to a change in electric field.

When an electric field is formed in the liquid crystal layer 125, the liquid crystal molecules 125a of the liquid crystal layer 125 may be arranged according to the direction of the electric field. Conversely, when no electric field is formed in the liquid crystal layer 125, the liquid crystal molecules 125a may be arranged irregularly or according to an alignment layer. As a result, the optical property of the liquid crystal layer 125 may depend on the presence/absence of an electric field passing through the liquid crystal layer 125.

At an edge of the liquid crystal panel 120, a cable 120a for transmitting image data to the liquid crystal panel 120, and a display driver integrated (DDI) circuit (hereinafter, referred to as a 'driver IC') 104 for processing image data and outputting an analog image signal may be positioned.

The cable 120a may electrically connect the control assembly 102 and/or power supply assembly 103 to the driver IC 104, and electrically connect the driver IC 104 to the liquid crystal panel 120.

The driver IC 104 may receive image data and power from the control assembly 102 and the power supply assembly 103, respectively, through the cable 120a, and transmit the image data and driving current to the liquid crystal panel 120 through the cable 120a.

The control assembly 102 may include a control circuit for controlling operations of the liquid crystal panel 120 and the backlight unit 110. The control circuit may process image data received from an external content source, transmit the image data to the liquid crystal panel 120, and transmit dimming data to the backlight unit 110.

The power supply assembly 103 may supply power to the liquid crystal panel 120 and the backlight unit 110 such that the backlight unit 110 outputs surface light and the liquid crystal panel 120 blocks or transmits light emitted from the backlight unit 110.

The control assembly 102 and the power supply assembly 103 may be implemented with a PCB and various circuits mounted on the PCB. For example, a power circuit may include a capacitor, a coil, a resistor, a processor, and a power circuit board on which the capacitor, the coil, the resistor, and the processor are mounted. Also, the control circuit may include a memory, a processor, and a control circuit board on which the memory and the processor are mounted.

Figure 5:
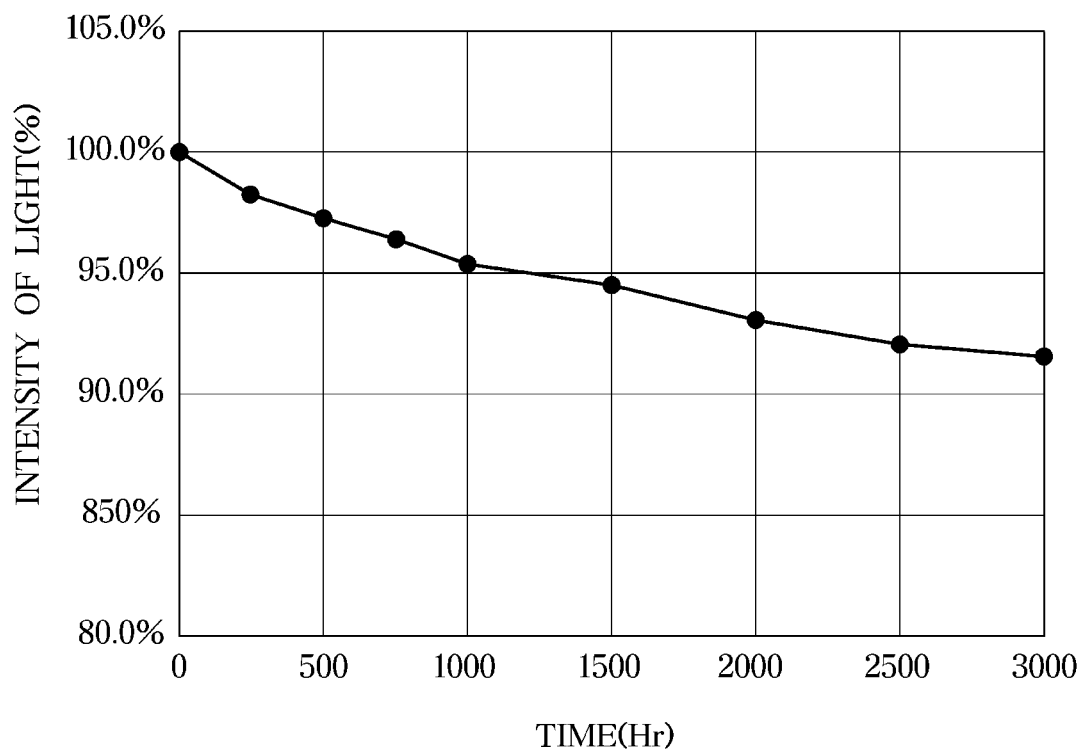
FIG. 5 shows degradation in brightness of a light source according to total operating time of a display apparatus according to an embodiment.
Figure 6:
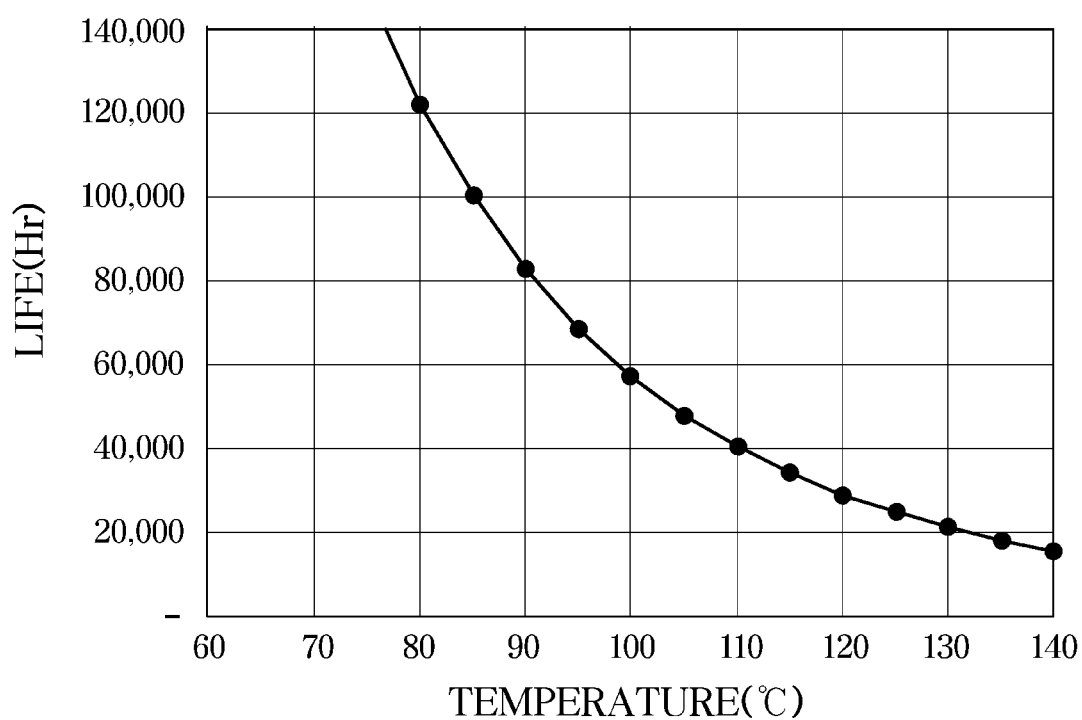
FIG. 6 shows a reduction of an expected life of a light source with respect to operating temperature of a display apparatus according to an embodiment.
Figure 7:
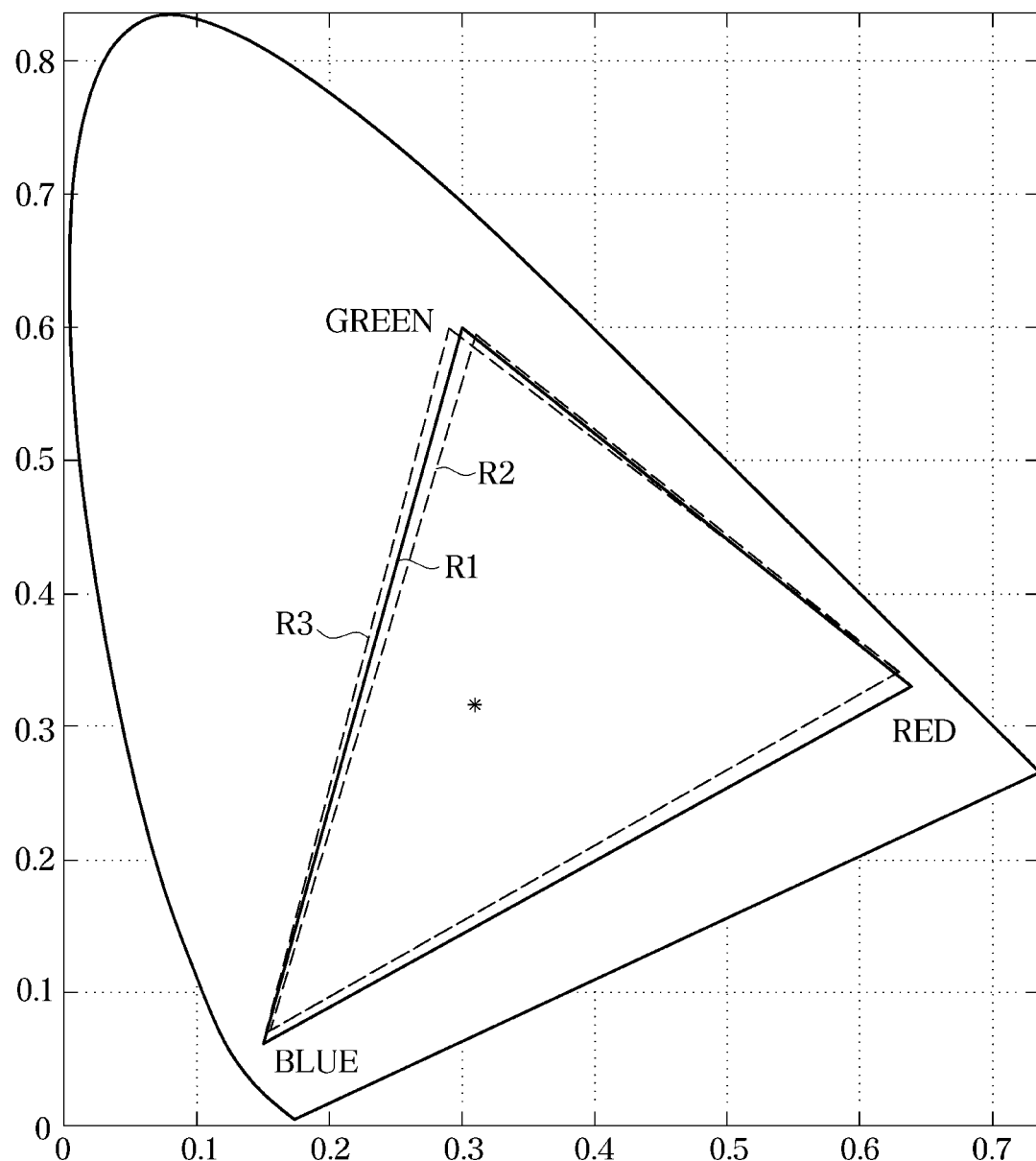
FIG. 7 shows a change of a color gamut according to a total operating time of a display apparatus according to an embodiment.
Figure 8:
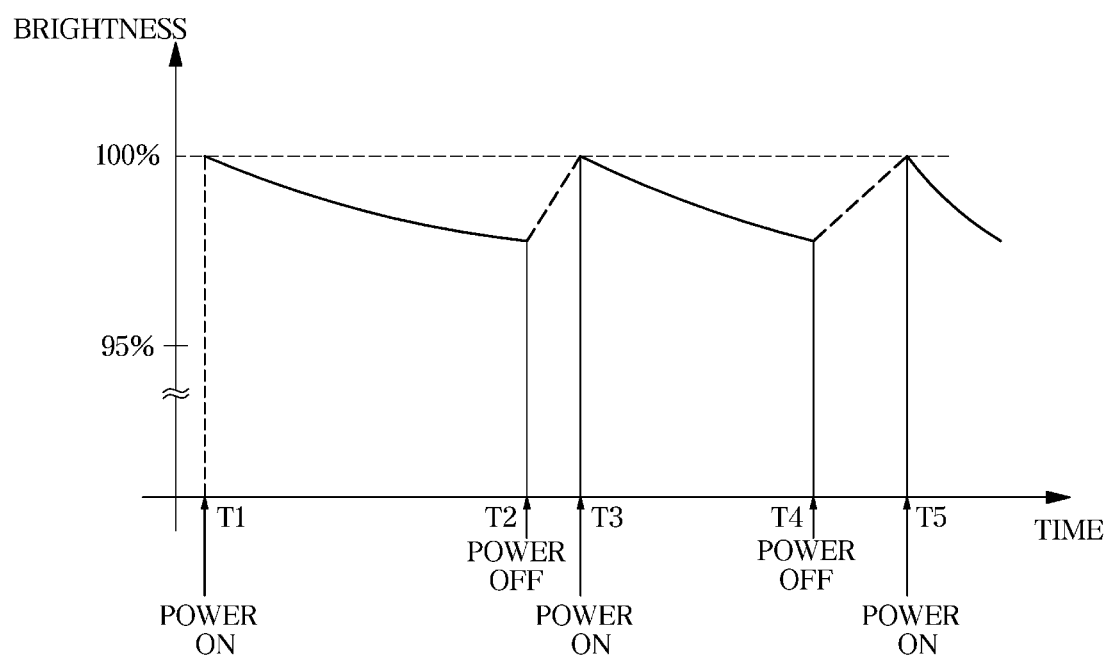
FIG. 8 shows degradation in brightness of a light source with respect to a continuous operation time of a display apparatus according to an embodiment.

FIG. 5 shows degradation in brightness of the light source according to a total operating time of the display apparatus according to an embodiment. FIG. 6 shows a reduction of an expected life of the light source with respect to operating temperature of the display apparatus according to an embodiment. FIG. 7 shows a change of a color gamut according to a total operating time of the display apparatus according to an embodiment. FIG. 8 shows degradation in brightness of the light source with respect to a continuous operation time of the display apparatus according to an embodiment.

The display apparatus 100 may include the backlight unit 110 for emitting light, and the liquid crystal panel 120 for blocking or transmitting light emitted from the backlight unit 110. Because the liquid crystal panel 120 blocks or transmits light emitted from the backlight unit 110, the display apparatus 100 may display an image having various colors and various brightness levels.

The display apparatus 100 may be designed to display optimal images for users when being manufactured as a product. However, as an operating time of the display apparatus 100 increases, performance of the display apparatus 100 may be degraded gradually. In other words, as an operating time of the display apparatus 100 tolls over time, image quality of the display apparatus 100 may be degraded.

Degradation in image quality of the display apparatus 100 may result from various causes.

For example, the image quality of the display apparatus 100 may be degraded when brightness of the light sources 111a included in the backlight unit 110 is degraded.

As shown in FIG. 5, as a total operating time of the display apparatus 100 increases, a total operating time of the light sources 111a may increase, and as the total operating time of the light sources 111a increases, intensity of light emitted from the light sources 111a may be reduced gradually. As shown in FIG. 5, when the operating time of the light sources 111a reaches 3000 hours, the brightness of the light sources 111a may be reduced by about 8% from that of the light sources 111a when the light sources 111a operate for the first time.

Degradation in brightness of the light sources 111a may be accelerated by an increase of an operating temperature. In other words, at higher operating temperature of the light sources 111a, the brightness of the light sources 111a may be degraded more quickly.

For example, it may be assumed that, when the brightness of the light sources 111a is degraded by about 50% from that of the light sources 111a when the light sources 111a operate for the first time, a life of the light sources 111a ends. As shown in FIG. 6, the life of the light sources 111a may be shorter at higher operating temperature. The light sources 111a may have a life of about 120,000 hours at a general operating temperature of about 80 t of the display apparatus 100, whereas the light sources 111a may have a life of about 40,000 hours at an operating temperature of about 110° C.

As such, at higher operating temperature of the display apparatus 100 the brightness of the light sources 111a may be degraded more quickly.

When the brightness of the light sources 111a is degraded, brightness of an image displayed on the display apparatus 100 may be degraded, and a contrast of the image may also be degraded. Furthermore, when the brightness of the light sources 111a is degraded, sharpness of an image displayed on the display apparatus 100 may be degraded, and colors may be blurred. Therefore, when the brightness of the light sources 111a is degraded, overall image quality of the display apparatus 100 may be degraded.

In addition, when the brightness of the light sources 111a is degraded, a color gamut of the display apparatus 100 may also change.

For example, as shown in FIG. 7, the display apparatus 100 may be designed to represent colors of a first color region R1 according to the International Organization for Standardization. However, due to degradation in brightness of the light sources 111a, a color gamut capable of being represented by the display apparatus 100 may be biased to a second color region R2 or a third color region R3.

Due to an increase of an operating time of the display apparatus 100, performance of other optical components as well as the performance of the light sources 111a may also be degraded.

For example, performance of the diffuser plate 113 included in the backlight unit 110 may be degraded, and accordingly, the brightness of the backlight unit 110 may be degraded or brightness uniformity of the backlight unit 110 may be degraded. Also, performance of the optical sheet 114 included in the backlight unit 110 may be degraded, and accordingly, the brightness of the backlight unit 110 may be degraded.

Also, performance of the liquid crystal layer 125 included in the liquid crystal panel 120 may be degraded, and accordingly, brightness uniformity of the pixels P may be degraded. In addition, performance of the color filter 127 included in the liquid crystal panel 120 may be degraded, and accordingly, a color gamut of the display apparatus 100 may change.

As the display apparatus 100 continues to operate after the display apparatus 100 is powered on (in other words, when the liquid crystal panel 120 and the backlight unit 110 start to operate), the image quality of the display apparatus 100 may be degraded.

For example, as shown in FIG. 8, as a continuous operating time of the display apparatus 100 increases, the brightness of the light sources 111a included in the display apparatus 100 may be degraded gradually.

Specifically, at a time of T1, the display apparatus 100 may be powered on, and after the time of T1, the brightness of the display apparatus 100 may gradually decrease. At a time of T2, the display apparatus 100 may be powered off. When the display apparatus 100 is again powered on at a time of T3, the brightness of the display apparatus 100 may return to its original brightness. After the time of T3, the brightness of the display apparatus 100 may again gradually decrease. Thereafter, at a time of T4, the display apparatus 100 may be powered off, and when the display apparatus 100 is again powered on at a time of T5, the brightness of the display apparatus 100 may again return to its original brightness.

During a short time (for example, several minutes or hours) in which the display apparatus 100 operates continuously, the brightness of the display apparatus 100 may be degraded gradually.

As described above, the image quality of the display apparatus 100 may be degraded over a long time or during a short time. The display apparatus 100 may compensate for degradation of image quality together with the service apparatus 200.

Figure 9:
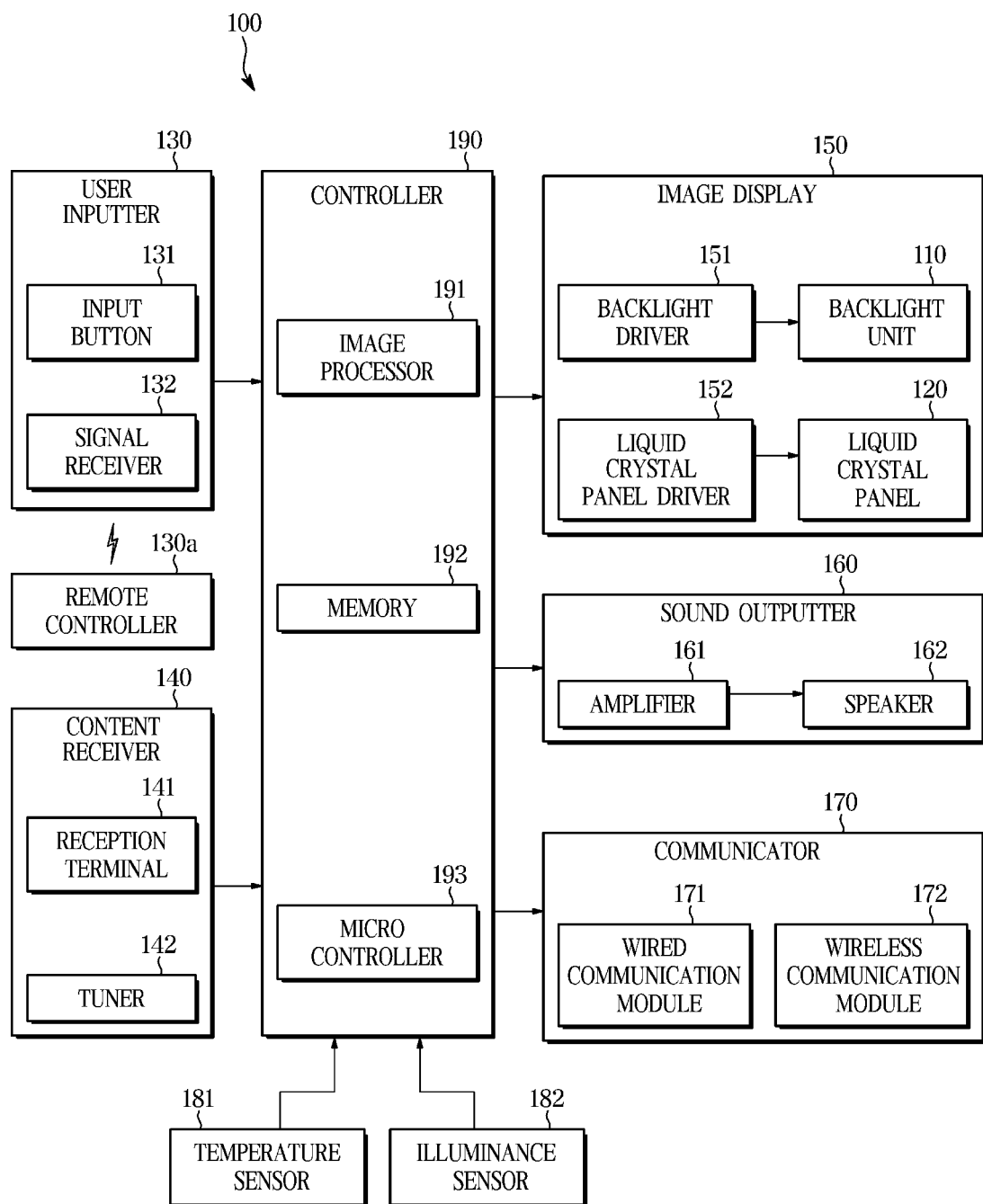
FIG. 9 shows a configuration of a display apparatus according to an embodiment.

FIG. 9 shows a configuration of the display apparatus according to an embodiment.

In the inside of the main body 101 of the display apparatus 100, components for executing functions of the display apparatus 100 may be installed.

As shown in FIG. 9, the display apparatus 100 may include a user inputter 130 for acquiring a user input from a user, a content receiver 140 for receiving video data and/or an audio signal from content sources, an image display 150 for displaying images, a sound outputter 160 for outputting sound, a communicator 170 for communicating with the service apparatus 200, a temperature sensor 181 for measuring temperature of the image display 150, an illuminance sensor 182 for measuring an illuminance outside the display 100, and a controller 190 for processing video data and/or an audio signal received by the content receiver 140 and controlling operations of the display apparatus 100.

The user inputter 130 may include an input button 131 for acquiring a user input. For example, the input button 131 may include a power button for turning on/off the display apparatus 100, a volume control button for enabling a user to control a volume of sound that is output from the display apparatus 100, a source selection button for enabling a user to select a content source, etc.

The input button 131 may acquire a user input, and output an electrical signal (a voltage or current) corresponding to the user input to the controller 190. The input button 131 may be implemented by various input devices, such as a push switch, a touch switch, a dial, a slide switch, a toggle switch, etc.

The user inputter 130 may include a signal receiver 132 for receiving a remote control signal of a remote controller 130a. The remote controller 130a for acquiring a user input may be separated from the display apparatus 100. The remote controller 130a may acquire a user input and transmit a wireless signal corresponding to the user input to the display apparatus 100. The signal receiver 132 may receive the wireless signal from the remote controller 130a, and output an electrical signal (a voltage or current) corresponding to the user input to the controller 190.

The content receiver 140 may include a reception terminal 141 for receiving content including video data and/or an audio signal from content sources, and a tuner 142.

The reception terminal 141 may receive video data and an audio signal from the content sources through a cable. For example, the reception terminal 141 may include, for example, a component (YPbPr/RGB) terminal, a composite video blanking and sync (CVBS) terminal, an audio terminal, a high definition multimedia interface (HDMI) terminal, a universal serial bus (USB) terminal, etc.

The tuner 142 may receive broadcasting signals from a broadcast reception antenna or a wired cable, and extract a broadcasting signal of a channel selected by a user from among the broadcasting signals. For example, the tuner 142 may transmit a broadcasting signal having a frequency corresponding to a channel selected by a user from among a plurality of broadcasting signals received through a broadcast reception antenna or a wired cable, and block the remaining broadcasting signals having the other frequencies.

The content receiver 140 may receive video data and an audio signal from content sources through the reception terminal 141 and/or the tuner 142, and output the video data and/or the audio signal to the controller 190.

The image display 150 may include the backlight unit 110 and the liquid crystal panel 120 for visually displaying images, a backlight driver 151 for driving the backlight unit 110, and a liquid crystal panel driver 152 for driving the liquid crystal panel 120.

The backlight driver 151 may perform local diming to change brightness levels of the backlight unit 110 depending on image data received from the controller 190. More specifically, the backlight driver 151 may supply driving current to the light-emitting module 111 of the backlight unit 110 such that the backlight unit 110 emits light of different brightness levels at different locations of the backlight unit 110. In other words, based on the image data received from the controller 190 requiring different brightness levels in an image, the backlight driver 151 may supply driving current to the light-emitting module 111 of the backlight unit 110 so that the required different brightness levels can be reflected in the image by controlling different locations or regions of the backlight unit 110.

The backlight driver 151 may acquire a driving parameter from the controller 190, and supply driving current (or a driving voltage) to the backlight unit 110 depending on the driving parameter. For example, the driving parameter may include a driving current gain. The backlight driver 151 may amplify driving current to be supplied to the backlight unit 110, depending on the driving current gain.

The liquid crystal panel 120 and the backlight unit 110 may be the same as the liquid crystal panel 120 and the backlight unit 110 described above with reference to FIGS. 3 and 4.

The liquid crystal panel driver 152 may receive image data from the controller 190, and control the plurality of pixels P included in the liquid crystal panel 120 to transmit or block light depending on the image data.

The liquid crystal panel driver 152 may include the display driver IC 104 described above with reference to FIG. 2.

The plurality of pixels P of the liquid crystal panel 120 may be arranged in a plurality of rows and a plurality of columns, and the liquid crystal panel driver 152 may include a gate driver for activating pixels included in any one of the plurality of rows of the liquid crystal panel 120, and a source driver for transmitting image data to the pixels activated by the gate driver.

The source driver may transmit image data to pixels included in a first row, pixels included in a second row, pixels included in a third row, . . . , and pixels included in a n-th row, sequentially. The image data may include color information and brightness information for each pixel P.

The source driver may convert image data into an analog voltage signal, and supply the analog voltage signal to the individual pixels P. Here, a voltage value of the analog voltage signal may depend on light transmittance of the liquid crystal panel 120 according to voltage. More specifically, the source driver may transfer an analog voltage signal having a voltage value corresponding to brightness information that the image data represents, to the pixels P.

The backlight driver 151 may supply driving current (or a driving voltage) to the backlight unit 110 in response to the image data received from the controller 190.

As such, the image display 150 may display an image having various colors and contrasts corresponding to the image data from the controller 190.

The sound outputter 160 may include a sound amplifier 161 for amplifying sound, and a speaker 162 for aurally outputting the amplified sound. The speaker 162 may convert an analog sound signal amplified by the sound amplifier 161 into sound (sound waves). For example, the speaker 162 may include a thin film that vibrates according to an electrical sound signal, and by a vibration of the thin film, sound waves may be generated.

The communicator 170 may include a wired communication module 171 communicating with an external apparatus (for example, a service apparatus) in a wired manner, and a wireless communication module 172 communicating with an external apparatus in a wireless manner.

The wired communication module 171 may access a gateway of an Internet service provider through a cable connected from the display apparatus 100 to the gateway. For example, the wired communication module 171 may communicate with the gateway through the Ethernet. The wired communication module 171 may transmit/receive data to/from the service apparatus 200 on a network via the gateway.

The wireless communication module 172 may communicate with an AP (or a user's gateway) connected to the gateway of the Internet service provider in a wireless manner. For example, the wireless communication module 172 may communicate with an AP through Wi-Fi, Bluetooth, or Zigbee. The wireless communication module 172 may transmit/receive data to/from the service apparatus 200 on the network via the AP and the gateway.

As such, the communicator 170 may transmit/receive data to/from the service apparatus 200 in response to a control signal of the controller 190. The communicator 170 may transfer communication data received from an external apparatus to the controller 190, and transfer communication data acquired from the controller 190 to the external apparatus.

The temperature sensor 181 may measure temperature of the backlight unit 110, and output an electrical signal (a voltage or current) corresponding to the temperature of the backlight unit 110 to the controller 190. The temperature sensor 181 may be a thermistor of which an electrical resistance value changes according to temperature.

The illuminance sensor 182 may measure an illuminance outside the display apparatus 100, and output an electrical signal (a voltage or current) corresponding to the illuminance to the controller 190. The illuminance sensor 182 may be a photodiode for generating a voltage or current according to an amount of incident light.

The controller 190 may include an image processor 191 for processing content received by the content receiver 140 to generate image data and sound data, a memory 192 for recording and/or storing programs and data for processing content, and a microcontroller 193 for controlling operations of the display apparatus 100 in response to a user input received by the user inputter 130.

The image processor 191 may decode video data received by the content receiver 140 to generate image data, and decode an audio signal received by the content receiver 140 to generate sound data. The image data and the sound data may be output to the image display 150 and the sound outputter 160, respectively.

The image processor 191 may process video data based on various image parameters to generate image data.

The image parameters may include, for example, a brightness level representing a degree of brightness and darkness of an image, a contrast representing a ratio of a brightness level of a dark area to a brightness level of a bright area, a sharpness level representing a degree of sharpness of an image, a color density representing a degree of thickness (or lightness) of a color of an image, and a color representing a balance between a blue color, a green color, and a red color. Furthermore, the image parameters may further include gamma representing a nonlinear relation between a brightness level by image data and a brightness level of the display apparatus 100, a color gamut representing an expression range of a color, and a chroma representing a degree of sharpness of a color.

The image parameters are not limited to parameters that are adjustable by a user, such as a brightness level, a contrast, a sharpness level, a color density, a color, etc. The image parameters may also include hidden parameters that are adjustable by an after-sales service personnel of a manufacturer or a designer of the display apparatus 100. The hidden parameters may not be published to a user, and may be adjustable in a factory mode through an authentication procedure. For example, the hidden parameters may include a regional setting, a tuner setting, a country setting, a target color gamut, a signal format, a service server address, an encoder/decoder option, a connector option, a communication option, etc.

The image parameters may have been set in advance by a designer of the display apparatus 100, or may be set by a user.

The image processor 191 may generate image data depending on a brightness level, a contrast, a sharpness level, a color density, a color, gamma, a color gamut, a chroma, etc., which have been set in advance or may be set by a user.

The image processor 191 may include an operational circuit that performs logic operations and arithmetic operations, and a storage circuit that stores operated data.

The memory 192 may store programs and data for processing video data included in content, and store temporary data that may be generated when the image processor 191 processes video data.

The memory 192 may store image parameters for enabling the image processor 191 to process video data. For example, the memory 192 may store a brightness level, a contrast, a sharpness level, a color density, a color, gamma, a color gamut, a chroma, etc., which have been set in advance or may be set by a user. Also, the memory 192 may store a driving current gain for controlling the backlight driver 151.

The memory 192 may include a non-volatile memory for storing data for a long time, such as read only memory (ROM) and a flash memory, and a volatile memory for temporarily storing data, such as a static random access memory (S-RAM) and a dynamic random access memory (D-RAM).

The microcontroller 193 may control the display apparatus 100 in response to a user input received through the user inputter 130.

For example, the microcontroller 193 may control the tuner 142 to extract a broadcasting signal of a channel selected by a user input for changing a channel. The microcontroller 193 may change the brightness level, the contrast, the sharpness level, the color density, the color, the gamma, the color gamut, and the chroma stored in the memory 192, in response to a user input for changing an image parameter. Also, the microcontroller 193 may change the driving current gain stored in the memory 192 in response to a user input for changing a driving parameter.

As a total operating time of the display apparatus 100 increases, the image quality of the display apparatus 100 may be degraded. A user may input different settings for improving the image quality of the display apparatus 100 to compensate for degradation in image quality of the display apparatus 100.

The microcontroller 193 may acquire a user input for improving the image quality of the display apparatus 100 through the user inputter 130. The microcontroller 193 may collect operation information and environment information of the display apparatus 100 in response to a user input for improving the image quality of the display apparatus 100, and control the communicator 170 to transmit the operation information and environment information of the display apparatus 100 and a request for a parameter for improving the image quality of the display apparatus 100 to the service apparatus 200.

According to an embodiment, the operation information may include identification information of the display apparatus 100, a total operating time of the display apparatus 100, operating temperature of the display apparatus 100, driving current that is supplied to the backlight unit 110, an image parameter that is currently applied to the display apparatus 100, etc. The environment information may include a region in which the display apparatus 100 is installed, illuminance outside the display apparatus 100, etc. However, the operation information and environment information of the display apparatus 100, which are transmitted to the service apparatus 200, are not limited to the above-mentioned information, and may include other various information about operation states and surrounding environments of the display apparatus 100.

The service apparatus 200 may output an image parameter and a driving parameter for improving the image quality of the display apparatus 100 depending on the operation information and environment information received from the display apparatus 100, The service apparatus 200 may transmit the image parameter and the driving parameter for improving the image quality of the display apparatus 100 to the display apparatus 100.

The microcontroller 193 may receive the image parameter and the driving parameter from the service apparatus 200 through the communicator 170, and store the received image parameter and the received driving parameter in the memory 192. The image processor 191 may generate image data depending on the image parameter stored in the memory 192. Also, the liquid crystal panel driver 152 and the backlight driver 151 may drive the liquid crystal panel 120 and the backlight unit 110, respectively, depending on the driving parameter stored in the memory 192.

The microcontroller 193 and the image processor 191 may be implemented as separate chips, or may be integrated into a single chip.

As such, the controller 190 may process video data included in content to generate image data, and control the display apparatus 100 in response to a user input. Also, the controller 190 may acquire an image parameter and a driving parameter for improving image quality from the service apparatus 200.

Figure 10:
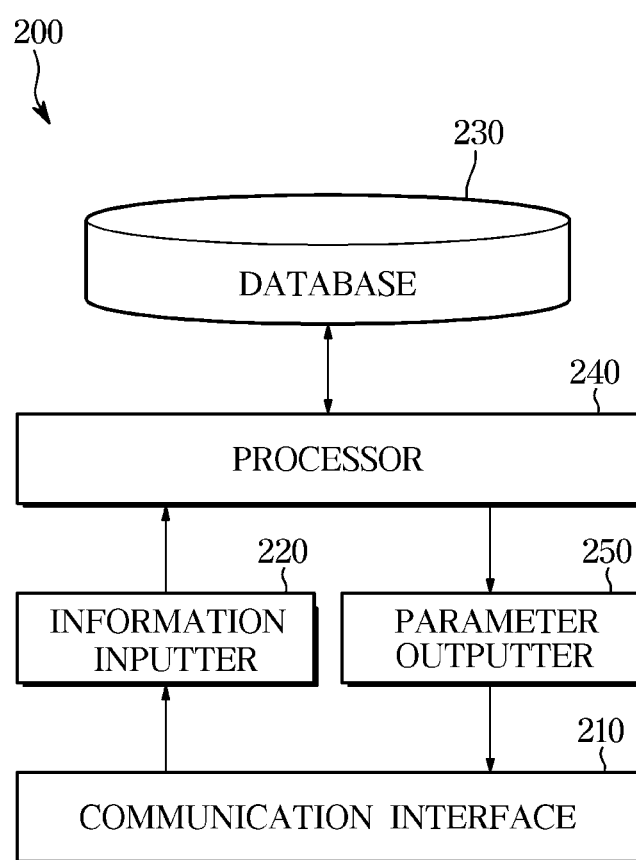
FIG. 10 shows a configuration of a service apparatus according to an embodiment.

FIG. 10 shows a configuration of a service apparatus according to an embodiment of the disclosure.

As shown in FIG. 10, the service apparatus 200 may include a communication interface 210, an information inputter 220, a database 230, a processor 240, and a parameter outputter 250.

The communication interface 210 may receive operation information/environment information and a parameter request from the display apparatus 100, and transmit an image parameter and a driving parameter to the display apparatus 100.

For example, the service apparatus 200 may be connected to the Internet which is a wide-area network, and the communication interface 210 may receive the operation information/environment information and the parameter request of the display apparatus 100 through the Internet. Also, the communication interface 210 may transmit the image parameter and the driving parameter to the display apparatus 100 through the Internet.

The communication interface 210 may be electrically connected to the information inputter 220, and may transfer the operation information/environment information of the display apparatus 100 and the parameter request to the information inputter 220. The communication interface 210 may be electrically connected to the parameter outputter 250, receive the image parameter and the driving parameter from the parameter outputter 250, and transmit the image parameter and the driving parameter to the display apparatus 100.

The information inputter 220 may receive the operation information/environment information of the display apparatus 100 and the parameter request from the communication interface 210, and perform a preparation operation for enabling the processor 240 to process the operation information and the environment information of the display apparatus 100. For example, the information inputter 220 may convert the operation information and the environment information of the display apparatus 100 into a format that may be processed by the processor 240. Also, the information inputter 220 may transfer the operation information and the environment information to the processor 240 in order of which the parameter request is received.

The database 230 may include information about display apparatuses of various models manufactured by various manufacturers.

The database 230 may include information about deterioration of the display apparatuses according to operation information and environment information of the display apparatuses. For example, the database 230 may include identification information of the display apparatuses, and information about brightness reductions and/or color changes of the display apparatuses depending on total operating times and average temperatures of the display apparatuses.

The information about brightness reductions and/or color changes of the display apparatuses may be acquired experimentally or empirically. For example, the display apparatuses may operate experimentally at various temperatures, and designers of the display apparatuses may measure brightness reductions and/or color changes of the display apparatuses according to the operating times of the display apparatuses by using an optical measuring system. The brightness reductions and/or color changes of the display apparatuses acquired experimentally or empirically may be stored in the service apparatus 200.

Also, the database 230 may include information about deterioration of the display apparatuses according to sales regions of the display apparatuses. For example, Asia, Europe, North America, and South America may use different broadcasting image compression standards. Accordingly, display apparatuses suitable for respective regions may be designed and sold. The regions may be under different temperature and humidity conditions, and due to the different temperature and humidity conditions of the regions, different image quality changes may occur according to total operating times of the display apparatuses. The database 230 may store information about different image quality changes depending on the regions.

The database 230 may include image parameters and driving parameters for improving the image qualities of the display apparatuses in correspondence to the information about the brightness reductions and/or color changes of the display apparatuses and the environment information of the display apparatuses.

The image parameters and the driving parameters corresponding to the brightness reductions and/or color changes of the display apparatuses may be acquired experimentally or empirically. For example, the designers of the display apparatuses may experimentally acquire image parameters and driving parameters for increasing brightness to compensate for a reduction of the brightness and restoring a color to its original state to correct a change of the color. The image parameters and the driving parameters of the display apparatuses acquired experimentally or empirically may be stored in the service apparatus 200.

The database 230 may include image parameters and driving parameters capable of correcting brightness reductions and/or color changes of the display apparatuses. The database 230 may store image parameters and driving parameters for improving the image qualities of the display apparatuses depending on environments (for example, geographic locations where the display apparatuses are installed and illuminance outside the display apparatuses) in which the display apparatuses are installed, as well as for correcting brightness reductions and/or color changes of the display apparatuses. For example, the database 230 may include image parameters and driving parameters for correcting brightness reductions and/or color changes of the display apparatuses depending on the geographic location where the display apparatus is installed and illuminance outside the display apparatus.

The database 230 may include image parameters and driving parameters capable of correcting brightness reductions and/or color changes of the display apparatuses according to sales regions of the display apparatuses. For example, the database 230 may include image parameters and driving parameters for correcting brightness reductions and/or color changes of the display apparatuses in consideration of average temperature and average humidity of the sales regions.

Furthermore, one display apparatus may have deviations in brightness reductions and/or color changes compared to another display apparatus. For example, products of the same model may have deviations of image quality changes according to manufacturing dates or components. The database 230 may store information about a deviation of a brightness reduction and/or a color change that may be generated for each product of the display apparatuses. Also, the database 230 may include an image parameter and a driving parameter for correcting a brightness reduction and/or a color change by reflecting a deviation of each product.

The processor 240 may acquire operation information and environment information of the display apparatus 100 from the information inputter 220, and verify the operation information and environment information of the display apparatus 100.

The processor 240 may determine whether the operation information and environment information of the display apparatus 100 are within a predetermined range. For example, the processor 240 may determine whether an operating temperature of the display apparatus 100 is within a predetermined temperature range, and, when the processor 240 determines that the operating temperature of the display apparatus 100 is out of the predetermined temperature range, the processor 240 may determine an erroneous operation of the display apparatus 100. Accordingly, the processor 240 may output a warning message indicating an erroneous operation of the display apparatus 100.

When the processor 240 determines that the operation information and environment information of the display apparatus 100 are within the predetermined range, the processor 240 may continue to process the operation information and environment information of the display apparatus 100.

The processor 240 may use the operation information of the display apparatus 100 to search the database 230 to obtain information about a brightness reduction and/or color change of a display apparatus corresponding to the operation information of the display apparatus 100.

The processor 240 may use the environment information of the display apparatus 100 to search the database 230 to obtain an image parameter and a driving parameter corresponding to the brightness reduction and/or color change of the display apparatus 100. The processor 240 may acquire an image parameter and a driving parameter for correcting the brightness reduction and/or color change of the display apparatus 100 from the database 230.

The parameter outputter 250 may receive the image parameter and the driving parameter for the display apparatus 100 from the processor 240, and transfer the image parameter and the driving parameter to the communication interface 210.

For example, the parameter outputter 250 may convert the image parameter output from the processor 240 into a format that may be processed by the display apparatus 100. The parameter outputter 250 may generate update data for updating the image parameter and the driving parameter of the display apparatus 100.

The parameter outputter 250 may transfer the update data to the communication interface 210.

The communication interface 210 may transfer the update data output from the parameter outputter 250 to the display apparatus 100 through a network NT.

As such, the service apparatus 200 may receive operation information and environment information from the display apparatus 100, and acquire an image parameter and a driving parameter for correcting a brightness reduction and/or color change of the display apparatus 100 based on the operation information and environment information of the display apparatus 100.

Figure 11:
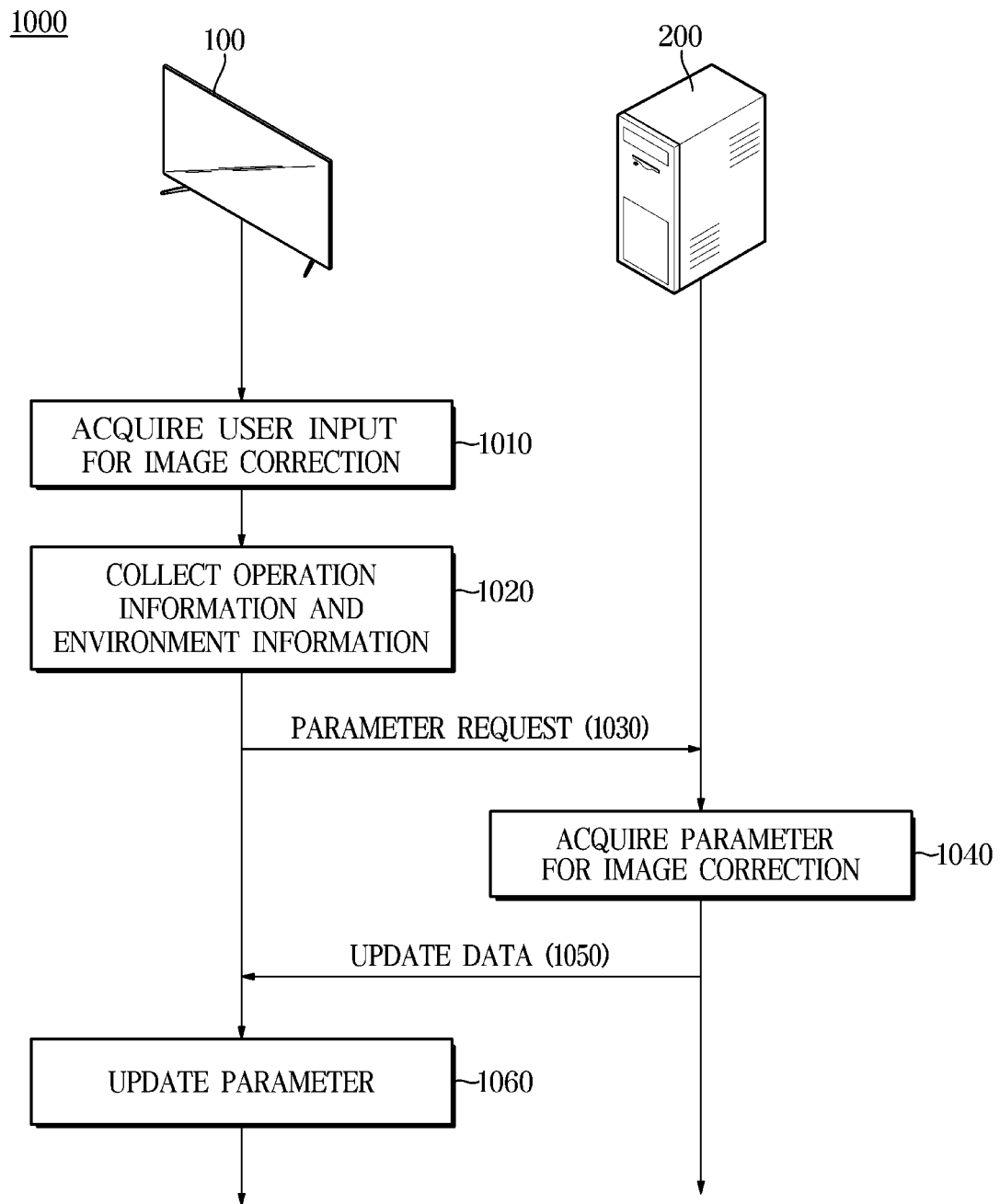
FIG. 11 shows an example of an operation for correcting an image quality change caused by long-term use of a display apparatus according to an embodiment.
Figure 12:
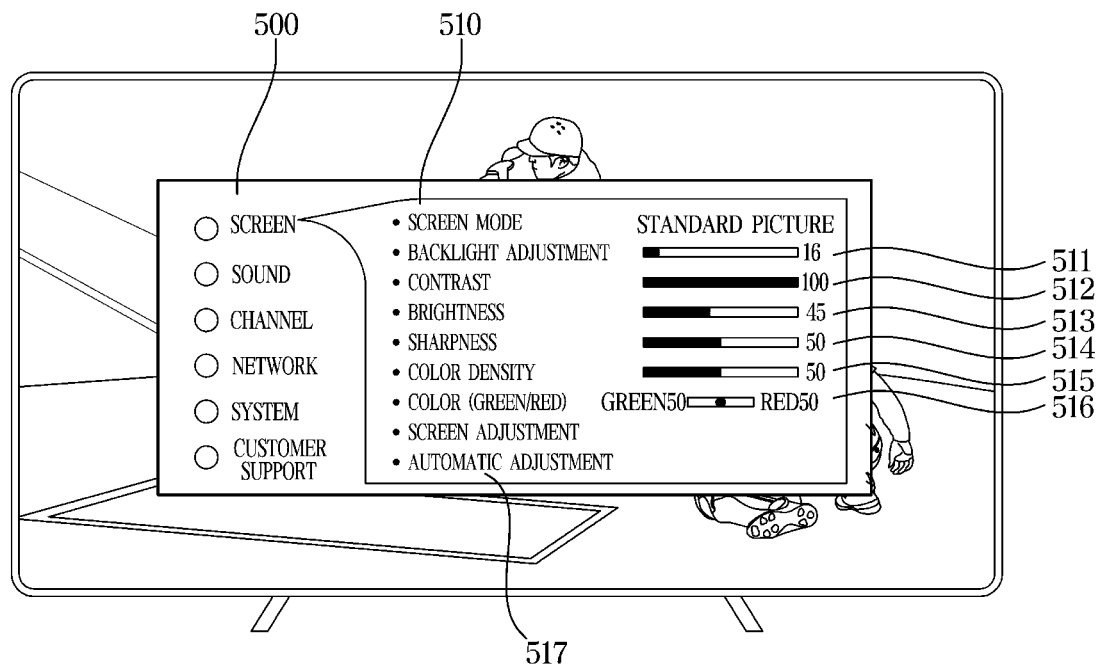
FIG. 12 shows an example screen for an image correction setting that is displayed by a display apparatus according to an embodiment.

FIG. 11 shows an example of an operation for correcting an image quality change caused by long-term use of the display apparatus according to an embodiment. FIG. 12 shows an example screen for image correction settings that is displayed by the display apparatus according to an embodiment.

Hereinafter, an operation 1000 for correcting an image quality change caused by long-term use of the display apparatus 100 will be described with reference to FIGS. 11 and 12.

The display apparatus 100 may acquire a user input for image correction from a user, in operation 1010.

As a total operating time of the display apparatus 100 increases after a user purchases the display apparatus 100, image quality of the display apparatus 100 may gradually degrade. That is, degradation in image quality of the display apparatus 100 may be caused by a reduction in intensity of light emitted from the light sources 111a included in the backlight unit 110 as a total operating time of the display apparatus 100 increases. Also, degradation in image quality of the display apparatus 100 may be caused by deterioration of the diffuser plate 113 included in the backlight unit 110 and deterioration of the optical sheet 114. Also, degradation in image quality of the display apparatus 100 may be caused by stress on the liquid crystal layer included in the liquid crystal panel 120 and deterioration of the color filter 127.

The user may provide a user input for correcting degradation in image quality of the display apparatus 100.

For example, the display apparatus 100 may display a setting screen 500 and a picture setting screen 510 as shown in FIG. 12, in response to a user input for a picture setting of the display apparatus 100.

The picture setting screen 510 may include a menu for adjusting an image parameter. For example, the picture setting screen 510 may include a backlight menu 511 for adjusting brightness of the backlight unit 110, a contrast menu 512 for adjusting a contrast of the screen, a brightness menu 513 for adjusting a brightness level of the screen, a sharpness menu 514 for adjusting a sharpness level of the screen, a color density menu 515 for adjusting a color density of the screen, and a color menu 516 for adjusting a color of the screen.

Also, the picture setting screen 510 may include an automatic adjustment menu 517 for automatically adjusting an image parameter.

The user may select the automatic adjustment menu 517 to correct degradation in image quality of the display apparatus 100 by using the user inputter 130 or the remote controller 130a of the display apparatus 100.

The controller 190 of the display apparatus 100 may receive the user input for correcting degradation in image quality of the display apparatus 100 through the user inputter 130.

As such, the display apparatus 100 may correct an image quality change caused by long-term use in response to a user input. However, conditions that are used by the display apparatus 100 to correct an image quality change caused by long-term use is not limited hereto.

For example, the display apparatus 100 may provide the user with an alarm for correcting an image quality change caused by long-term use whenever a total operating time of the display apparatus 100 reaches a predetermined period. Specifically, the display apparatus 100 may output a message indicating that a correction for an image quality change is needed for the display apparatus by an image or sound whenever a total operating time of the display apparatus 100 reaches, for example, 500 hours, 1,000 hours, 1,500 hours, and 2,000 hours. The user may check the message, and provide a user input for correcting degradation in image quality of the display apparatus 100. Therefore, the display apparatus 100 may guide the user to correct an image quality change every predetermined period.

The display apparatus 100 may determine whether a total operating time of the display apparatus 100 reaches the predetermined period when the display apparatus 100 is powered on or off. When the display apparatus 100 determines that the total operating time of the display apparatus 100 reaches the predetermined period, the display apparatus 100 may provide the user with an alarm for correcting an image quality change caused by long-term use. For example, when the display apparatus 100 is powered on/off, the display apparatus 100 may determine whether a total operating time of the display apparatus 100 reaches, for example, 500 hours, 1,000 hours, 1,500 hours, or 2,000 hours. When the display apparatus 100 determines that the total operating time of the display apparatus 100 reaches about 500 hours, 1,000 hours, 1,500 hours, or 2,000 hours, the display apparatus 100 may output a message indicating that a correction for an image quality change is needed for the display apparatus by an image or sound.

Alternatively, whenever the total operating time of the display apparatus 100 reaches the predetermined period, the display apparatus 100 may automatically correct an image quality change caused by long-term use. For example, whenever the total operating time of the display apparatus 100 reaches, for example, 500 hours, 1,000 hours, 1,500 hours, or 2,000 hours, the display apparatus 100 may request the service apparatus 200 to transmit an image parameter and a driving parameter. Therefore, the display apparatus 100 may correct an image quality change every predetermined period according to the received image parameter and driving parameter.

Furthermore, whenever the display apparatus 100 is powered off, the display apparatus 100 may still correct an image quality change caused by long-term use. When a user's operation off input is received through the user inputter 130 or the remote controller 130a, the display apparatus 100 may request the service apparatus 200 to transmit an image parameter and a driving parameter. Therefore, the display apparatus 100 may correct an image quality change in a state in which the screen is turned off so that the user may not recognize a correction of image quality.

The display apparatus 100 may determine whether the total operating time of the display apparatus 100 reaches the predetermined period when the display apparatus 100 is powered off, and, when the display apparatus 100 determines that the total operating time of the display apparatus 100 reaches the predetermined period, the display apparatus 100 may correct an image quality change caused by long-term use. For example, when the display apparatus 100 is powered on or off, the display apparatus 100 may determine whether the total operating time of the display apparatus 100 reaches about 500 hours, 1,000 hours, 1,500 hours, or 2,000 hours. When the display apparatus 100 determines that the total operating time of the display apparatus 100 reaches about 500 hours, 1,000 hours, 1,500 hours, or 2,000 hours, the display apparatus 100 may request the service apparatus 200 to transmit an image parameter and a driving parameter. Therefore, the display apparatus 100 may correct an image quality change every predetermined period in the state in which the screen is turned off so that the user may not recognize a correction of image quality.

The display apparatus 100 may collect operation information and environment information of the display apparatus 100, in operation 1020.

The controller 190 may collect information about operations of the display apparatus 100 through various sensors and storage media installed in the display apparatus 100.

For example, identification information of the display apparatus 100 may be stored in advance in the memory 192. The controller 190 may measure or compute a total operating time of the display apparatus 100 after the display apparatus 100 operates for the first time, and while the display apparatus 100 operates, and the controller 190 may store the measured total operating time in the memory 192. The controller 190 may acquire operating temperature of the display apparatus 100 from the temperature sensor 181 while the display apparatus 100 operates, and may calculate average operating temperature of the display apparatus 100. Also, the controller 190 may measure driving current that is supplied to the light sources 111*a* of the backlight unit 110 while the display apparatus 100 operates. However, the embodiments described above are not limited thereto. For example, the controller 190 may acquire operating temperature of the display apparatus 100 from the temperature sensor 181 even when the display apparatus is not operating.

Also, the controller 190 may collect information about an environment of the display apparatus 100 through the various sensors and storage media installed in the display apparatus 100.

For example, the controller 190 may store information about a region in which the display apparatus 100 is sold, and acquire illuminance outside the display apparatus 100 from the illuminance sensor 182 while the display apparatus 100 operates. The controller 190 may also acquire illuminance information from the illuminance sensor 182 when the display apparatus is not operating.

The display apparatus 100 may transmit a request for a parameter for image correction of the display apparatus 100 to the service apparatus 200, in operation 1030.

The controller 190 may control the communicator 170 to transmit a message for requesting an image parameter and a driving parameter for image correction of the display apparatus 100 to the service apparatus 200. Also, the controller 190 may control the communicator 170 to transmit operation information and environment information of the display apparatus 100, together with the message for requesting the image parameter and the driving parameter, to the service apparatus 200.

The communication interface 210 of the service apparatus 200 may receive the message for requesting the image parameter and the driving parameter and the operation information and environment information of the display apparatus 100 from the display apparatus 100.

The service apparatus 200 may acquire a parameter for image correction of the display apparatus 100, in operation 1040.

The processor 240 of the service apparatus 200 may process the operation information and environment information of the display apparatus 100, in response to the request for the parameter from the display apparatus 100.

The processor 240 may input the operation information and environment information of the display apparatus 100 simultaneously to the database 230, and acquire an image parameter for correcting a brightness reduction and/or color change of the display apparatus 100 from the database 230.

The processor 240 may input the operation information of the display apparatus 100 to the database 230, and acquire information about a brightness reduction and/or color change of the display apparatus 100 corresponding to the operation information of the display apparatus 100 from the database 230. The processor 240 may input, together with the information about the brightness reduction and/or color change of the display apparatus 100, the environment information of the display apparatus 100 to the database 230, and acquire an image parameter for correcting the brightness reduction and/or color change of the display apparatus 100 from the database 230. The image parameter may include, for example, a brightness level, a contrast, a sharpness level, a color density, and a color of the screen of the display apparatus 100.

Also, the processor 240 may input the operation information and environment information of the display apparatus 100 simultaneously to the database 230, and acquire a driving parameter for correcting the brightness reduction and/or color change of the display apparatus 100 from the database 230. The driving parameter may include, for example, a driving current gain for amplifying driving current to be supplied to the light sources 111*a* of the backlight unit 110.

The service apparatus 200 may convert the image parameter and the driving parameter into update data for updating parameters of the display apparatus 100.

The service apparatus 200 may transmit the update data of the display apparatus 100 to the display apparatus 100, in operation 1050.

The communication interface 210 of the service apparatus 200 may transmit the update data for updating an image parameter and a driving parameter to the display apparatus 100.

The controller 190 of the display apparatus 100 may receive the update data through the communicator 170.

Then, the display apparatus 100 may update the image parameter and the driving parameter, in operation 1060.

The controller 190 may update the image parameter and the driving parameter by using the update data received from the service apparatus 200. The controller 190 may extract an image parameter and a driving parameter from the update data, and store the extracted image parameter and driving parameter in the memory 192.

The display apparatus 100 may display an image based on the updated image parameter and driving parameter. The image processor 191 may process video data based on the updated image parameter stored in the memory 192 to generate image data. The backlight driver 151 of the image display 150 may supply driving current to the light sources 111*a* of the backlight unit 110 based on the updated driving parameter stored in the memory 192.

As described above, the display apparatus 100 may correct degradation of image quality caused by long-term use of the display apparatus 100, together with the service apparatus 200. Therefore, the display apparatus 100 may maintain image quality of the display apparatus 100 of when the user purchases the display apparatus 100 for the first time.

Particularly, the service apparatus 200 may have excellent data computing capability and data storage capability compared to the display apparatus 100. Accordingly, the service apparatus 200 may process various operation information and various environment information of the display apparatus 100, and store image parameters and driving parameters corresponding to the various operation information and various environment information.

Figure 13:
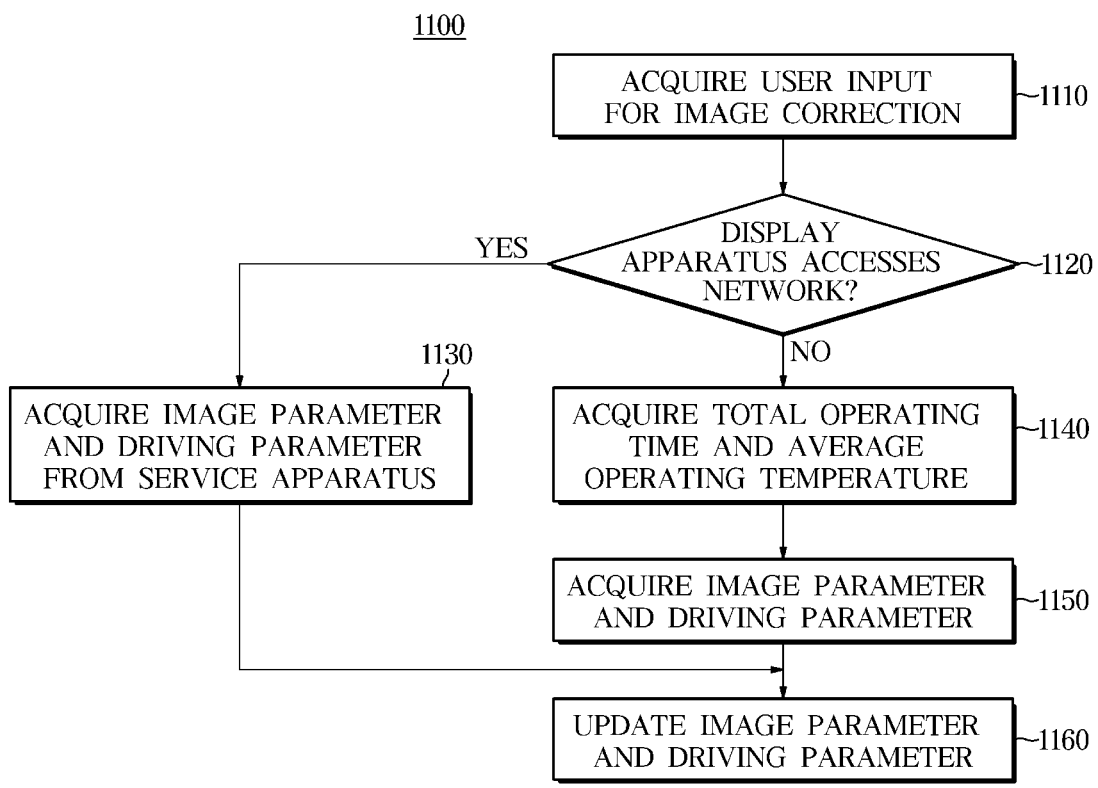
FIG. 13 shows a flowchart of an operation for correcting an image quality change caused by long-term use of a display apparatus according to an embodiment.

FIG. 13 shows a flowchart of an operation for correcting an image quality change caused by long-term use of the display apparatus according to an embodiment.

According to the embodiments described above, the display apparatus 100 may correct an image quality change caused by long-term use together with the service apparatus 200 through a network NT. According to another embodiment, when the display apparatus 100 fails to access a network NT, the display apparatus 100 may still correct an image quality change by itself.

Hereinafter, an operation 1100 for correcting an image quality change caused by long-term use of the display apparatus 100 will be described with reference to FIG. 13.

The display apparatus 100 may acquire a user input for image correction from a user, in operation 1110.

Operation 1110 may be the same as operation 1010 of FIG. 11.

The display apparatus 100 may determine whether the display apparatus 100 can access a network NT, in operation 1120.

The controller 190 may control the communicator 170 to transmit a message requesting a response. Thereafter, the controller 190 may determine whether a response signal is received through the communicator 170.

When a response signal is received, the controller 190 may determine that the display apparatus 100 may access the network NT.

When no response signal is received in a predetermined time period, the controller 190 may determine that the display apparatus 100 has failed to access the network NT.

When the controller 190 determines that the display apparatus 100 may access the network NT (YES in operation 1120), the display apparatus 100 may connect to the network NT and acquire an image parameter and a driving parameter from the service apparatus 200, in operation 1130.

The display apparatus 100 may collect operation information and environment information of the display apparatus 100. The display apparatus 100 may transmit a request for a parameter for image correction of the display apparatus 100 to the service apparatus 200. The display apparatus 100 may receive update data including an image parameter and a driving parameter from the service apparatus 200.

As such, the display apparatus 100 may perform the same operations as operations 1020, 1030, 1040, and 1050 of FIG. 11.

However, when the controller 190 determines that the display apparatus 100 has failed to access the network NT (NO in operation 1120), the display apparatus 100 may acquire a total operating time and average operating temperature of the display apparatus 100, in operation 1140.

The controller 190 may acquire a total operating time and average operating temperature of the display apparatus 100 through various sensors and storage media installed in the display apparatus 100.

The controller 190 may measure a total operating time of the display apparatus 100 after the display apparatus 100 operates for the first time, and store the measured total operating time in the memory 192. The controller 190 may acquire operating temperature of the display apparatus 100 from the temperature sensor 181 while the display apparatus 100 operates, and calculate average operating temperature of the display apparatus 100.

The controller 190 may acquire a total operating time and average operating temperature of the display apparatus 100 from the memory 192.

The display apparatus 100 may acquire an image parameter and a driving parameter, in operation 1150.

The controller 190 may acquire an image parameter and a driving parameter for correcting an image quality change corresponding to the total operating time and average operating temperature of the display apparatus 100 from the memory 192.

The image parameter and driving parameter for correcting the image quality change caused by long-term use may have been stored in advance in the memory 192. The image parameter and driving parameter may have been set experimentally or empirically in advance by a designer of the display apparatus 100, and stored in the memory 192 of the display apparatus 100.

Also, the controller 190 may predict a brightness reduction and/or color change of the display apparatus 100 based on the total operating time and average operating temperature of the display apparatus 100, and calculate an image parameter and a driving parameter based on the predicted brightness reduction and/or color change.

The display apparatus 100 may update an image parameter and a driving parameter, in operation 1160.

The controller 190 may update an image parameter and a driving parameter that are currently applied by using the acquired image parameter and driving parameter. The display apparatus 100 may display an image based on the updated image parameter and driving parameter.

As such, the display apparatus 100 may correct an image quality change caused by long-term use in response to a user input. However, conditions that are used by the display apparatus 100 to correct an image quality change caused by long-term use are not limited hereto. The display apparatus 100 may correct an image quality change caused by long-term use whenever the total operating time of the display apparatus 100 reaches the predetermined period or whenever the display apparatus 100 is powered off.

As described above, the display apparatus 100 itself may correct degradation of image quality caused by an image quality change. Therefore, the display apparatus 100 may maintain image quality of the display apparatus 100 of when the user purchases the display apparatus 100 for the first time.

Figure 14:
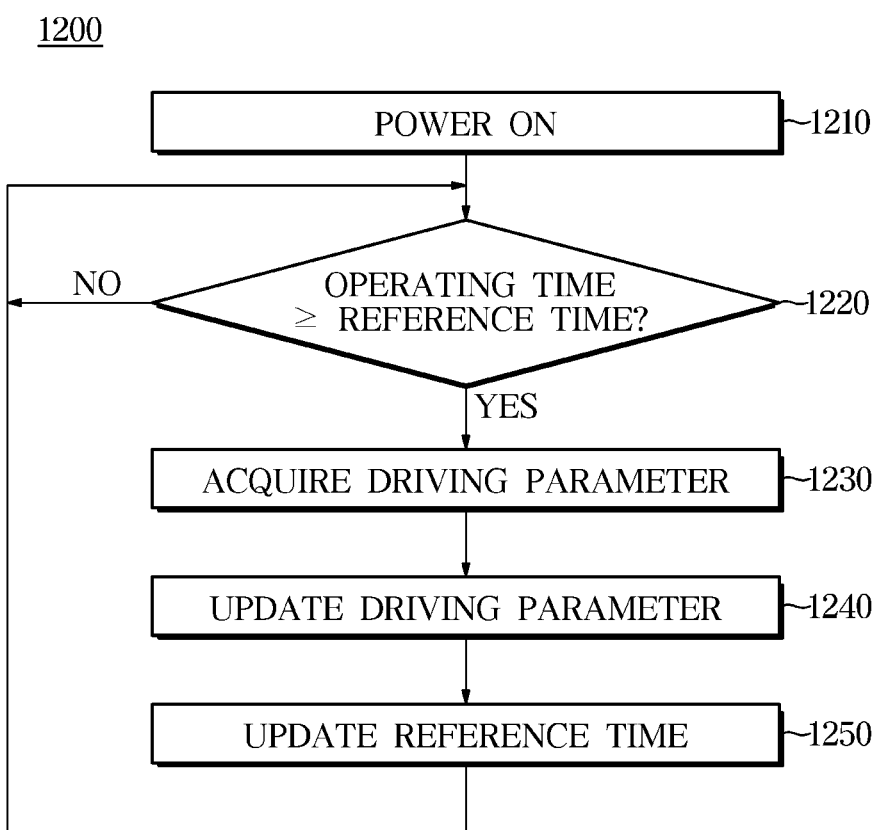
FIG. 14 shows a flowchart of operations of a service apparatus and a display apparatus according to an embodiment.

FIG. 14 shows another flowchart of operations of the service apparatus and the display apparatus according to an embodiment.

A case in which the display apparatus 100 corrects an image quality change caused by long-term use has been described above. The display apparatus 100 may be subject to slight degradation of brightness by short-time operations as well as long-time operations.

Hereinafter, an operation 1200 of correcting an image quality change caused by short-time use of the display apparatus 100 will be described with reference to FIG. 14.

The display apparatus 100 may be turned on, in operation 1210.

The display apparatus 100 may be turned on in response to a user input.

For example, the display apparatus 100 may wait in a plug-in state in which a plug is inserted into an outlet. When an operation command is input through the user inputter 130 or the remote controller 130*a* in the plug-in state, the display apparatus 100 may be turned on.

More specifically, the display apparatus 100 may supply power to the liquid crystal panel 120 and the backlight unit 110 in response to an operation command, and display an image by operations of the liquid crystal panel 120 and the backlight unit 110.

The display apparatus 100 may determine whether an operating time elapsed after the display apparatus 100 is turned on is longer than or equal to a reference time for correcting image quality, in operation 1220.

The controller 190 may record or measure a time elapsed after the display apparatus 100 starts operating (in other words, a time when the display apparatus 100 is turned on). Also, the controller 190 may compare the recorded operating time of the display apparatus 100 to the reference time for correcting image quality.

When the display apparatus 100 determines that the operating time of the display apparatus 100 is shorter than the reference time for correcting image quality (NO in operation 1220), the display apparatus 100 may repeatedly compare the operating time to the reference time.

When the display apparatus 100 determines that the operating time of the display apparatus 100 is longer than or equal to the reference time for correcting image quality (YES in operation 1220), the display apparatus 100 may acquire a driving parameter, in operation 1230.

The controller 190 may acquire a driving parameter for correcting an image quality change corresponding to the operating time of the display apparatus 100 elapsed after the display apparatus 100 is turned on, from the memory 192.

The driving parameter for correcting an image quality change caused by short-time use of the display apparatus 100 may have been stored in advance in the memory 192. The driving parameter may have been set experimentally or empirically in advance by a designer of the display apparatus 100 and stored in the memory 192 of the display apparatus 100. Also, the driving parameter for correcting an image quality change caused by short-time use of the display apparatus 100 may be received from the service apparatus 200 and updated, together with a driving parameter for correcting an image quality change caused by long-time use of the display apparatus 100.

Also, the controller 190 may predict a brightness reduction and/or color change of the display apparatus 100 based on the operating time of the display apparatus 100 elapsed after the display apparatus 100 is turned on, and calculate a driving parameter for correcting the predicted brightness reduction and/or color change.

The display apparatus 100 may update a driving parameter, in operation 1240.

The controller 190 may update a driving parameter that is currently applied, by using the acquired driving parameter. The display apparatus 100 may drive the backlight unit 110 depending on the updated driving parameter.

The display apparatus 100 may update the reference time for correcting image quality, in operation 1250.

The controller 190 may update the driving parameter for correcting an image quality change caused by short-time use of the display apparatus 100, and then, the controller 190 may update the reference time to additionally correct the image quality change. For example, the controller 190 may update the reference time to a sum of the reference time and an additional time as a new reference time, where the additional time may be equal to the reference time.

Thereafter, the display apparatus 100 may determine whether the operating time of the display apparatus 100 elapsed after the display apparatus 100 is turned on is longer than or equal to the reference time for correcting image quality.

As such, the display apparatus 100 may correct an image quality change caused by short-time use every predetermined time (for example, every reference time). Therefore, the display apparatus 100 may correct an image quality change that may be caused when the display apparatus 100 is in a turned-on state.

Figure 15:
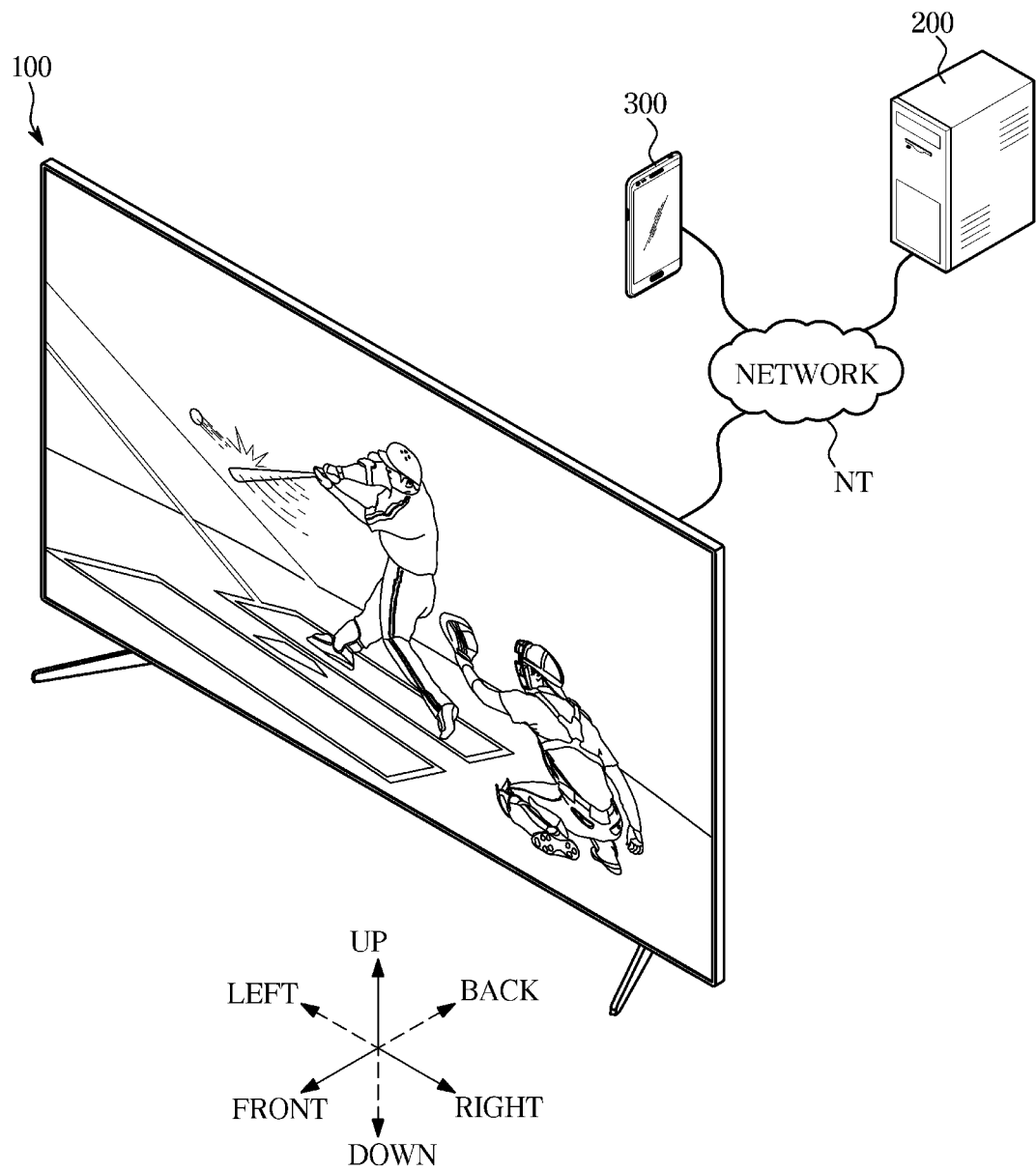
FIG. 15 shows a display apparatus, a service apparatus, and a user apparatus, according to an embodiment.
Figure 16:
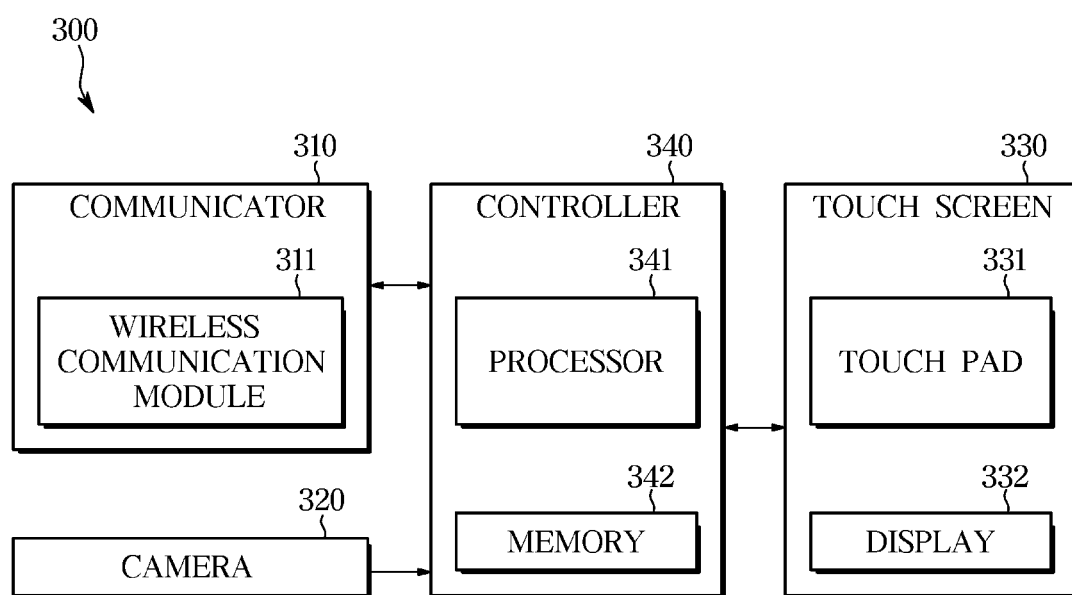
FIG. 16 shows a configuration of a user apparatus according to an embodiment.

FIG. 15 shows the display apparatus, the service apparatus, and the user apparatus, according to an embodiment. FIG. 16 shows a configuration of the user apparatus according to an embodiment.

As shown in FIG. 15, the display apparatus 100 may be connected to the service apparatus 200 and a user apparatus 300 in a wired or wireless manner through a network NT.

Here, the display apparatus 100 and the service apparatus 200 may be the same as the display apparatus 100 and the service apparatus 200 shown in FIG. 1, respectively.

The user apparatus 300 may be a computing device operated by a user of the display apparatus 100. For example, the user apparatus 300 may be a handy terminal, a multimedia terminal, personal digital assistant (PDA), a tablet computer, a laptop computer, a smart watch, smart glasses, etc.

The user apparatus 300 may communicate with the display apparatus 100 through the network NT or through a peer to peer (P2P) communication.

The user apparatus 300 may acquire a user input for correcting an image of the display apparatus 100 from the user, or receive a user input for correcting an image of the display apparatus 100 from the display apparatus 100. The user apparatus 300 may photograph a screen of the display apparatus 100 in response to the user input, and transmit an image obtained by photographing the screen of the display apparatus 100 to the service apparatus 200.

The service apparatus 200 may determine an image quality change of the display apparatus 100 by receiving the image obtained by photographing the screen of the display apparatus 100, from the user apparatus 300, and provide a parameter for correcting the image quality change to the user apparatus 300 or the display apparatus 100.

As shown in FIG. 16, the user apparatus 300 may include a communicator 310 for communicating with the display apparatus 100 and the service apparatus 200, a camera 320 for photographing an object, a touch screen 330 for interacting with a user, and a controller 340 for controlling operations of the user apparatus 300.

The communicator 310 may include a wireless communication module 311 for communicating with an external apparatus in a wireless manner.

The wireless communication module 311 may transmit/receive data to/from the external apparatus through a mobile communication. The wireless communication module 311 may use a mobile communication method, such as, for example, TDMA, CDMA, WCDMA, CDMA2000, Wibro, WiMAX, LTE, Wibro Evolution, etc.

The wireless communication module 311 may transmit/receive data to/from the external apparatus by using a short-range wireless communication. The wireless communication module 311 may use a communication method, such as, for example, Wi-Fi, Bluetooth, Zigbee, Infrared communication, UWB communication, etc.

As such, the communicator 310 may transmit/receive data to/from the display apparatus 100 and the service apparatus 200 in response to a control signal of the controller 340. The communicator 310 may transfer communication data received from the external apparatus to the controller 340, and transmit communication data acquired from the controller 340 to the external apparatus.

The camera 320 may include a plurality of photodiodes for converting an optical signal into an electrical signal. The photodiodes may be arranged in a plurality of rows and a plurality of columns. Each of the photodiodes may receive light, and output an electrical signal representing intensity of the received light.

The camera 320 may acquire an image including electrical signals output from the photodiodes, and output the acquired image to the controller 340. The camera 320 may include, for example, a charge-coupled device (CCD) image sensor or a complementary metal-oxide-semiconductor (CMOS) image sensor.

As such, the camera 320 may photograph a screen S of the display apparatus 100 in response to a control signal of the controller 340, and transfer an image obtained by photographing the screen S to the controller 340.

The touch screen 330 may include a touch pad 331 and a display 332.

The touch pad 331 may acquire a user input made through a user's touch. For example, the touch pad 331 may acquire a user input for correcting an image quality change or a user input for photographing a screen S of the display apparatus 100.

The touch pad 331 may output an electrical signal corresponding to the acquired user input to the controller 340.

The display 332 may receive image data from the controller 340, and display an optical image corresponding to the image data. For example, the display 332 may display the image of the screen S photographed by the camera 320.

The controller 340 may include a processor 341 for outputting a control signal for controlling operations of the user apparatus 200 in response to a user input, and a memory 342 for memorizing and/or storing programs and data for controlling operations of the user apparatus 300.

The processor 341 may generate a control signal for controlling the communicator 310, the camera 320, and the touch screen 330 in response to a user input acquired through the touch screen 330.

For example, the processor 341 may acquire a user input for compensating for degradation in image quality of the display apparatus 100 through the touch screen 330. In response to the user input, the processor 341 may output a communication control signal for transmitting a message representing a user input for image correction to the display apparatus 100 to the communicator 310.

Also, the processor 341 may receive a response signal of the display apparatus 100 through the communicator 310. In response to the response signal, the processor 341 may output a photographing control signal for photographing the screen S of the display apparatus 100 to the camera 320.

The memory 342 may record and/or store programs and data for controlling the communicator 310, the camera 320, and the touch screen 330.

Also, the memory 342 may temporarily store a user input acquired through the touch screen 330, and temporarily store an image acquired by the camera 320.

The memory 342 may include a volatile memory, such as S-RAM and D-RAM, and a non-volatile memory, such as ROM, EPROM, and a flash memory.

As such, the controller 340 may control operations of the communicator 310, the camera 320, and the touch screen 330 depending on a user input acquired through the touch screen 330.

Figure 17:
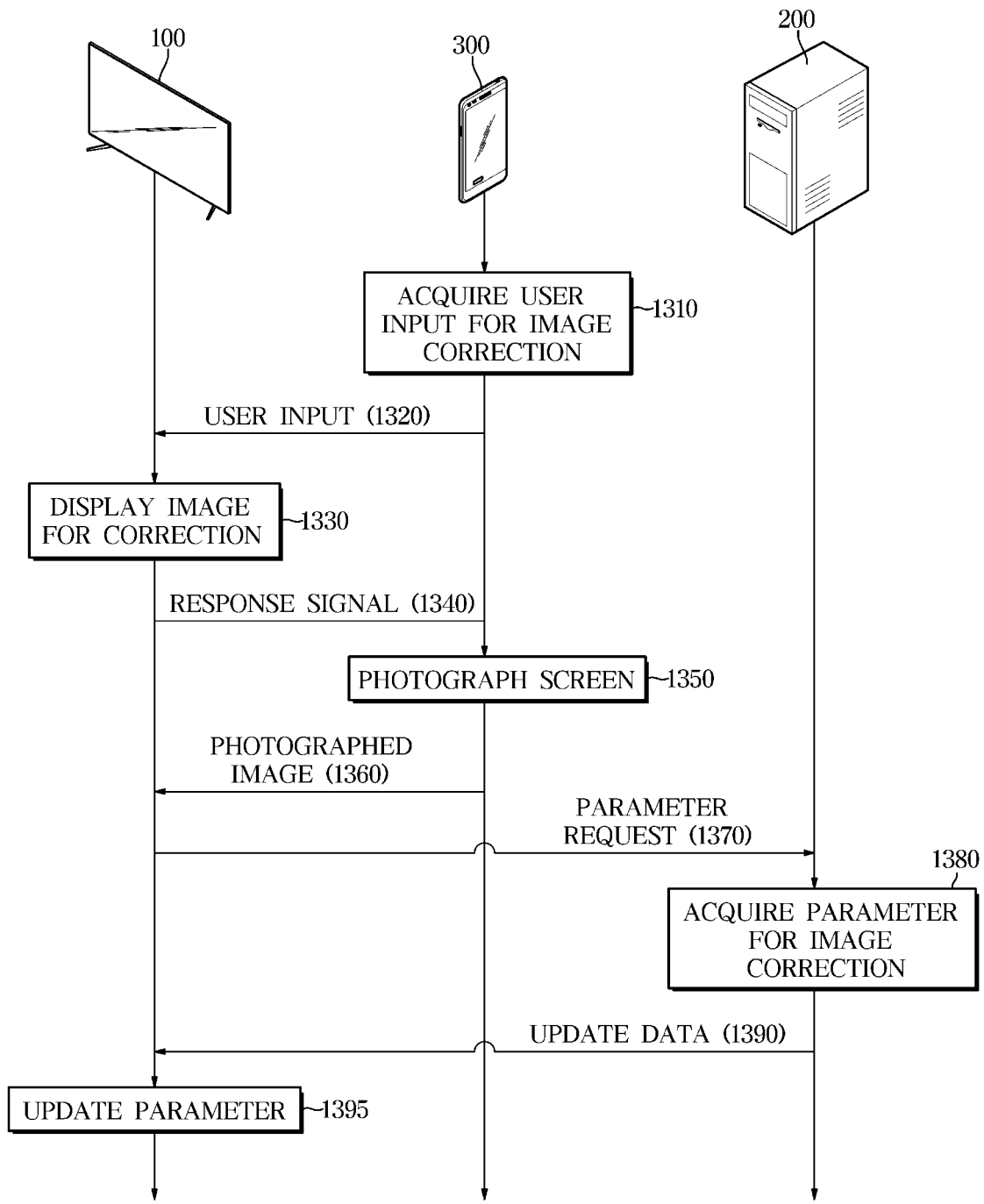
FIG. 17 shows an example of an operation for correcting an image quality change caused by long-term use of a display apparatus according to an embodiment.
Figure 18:
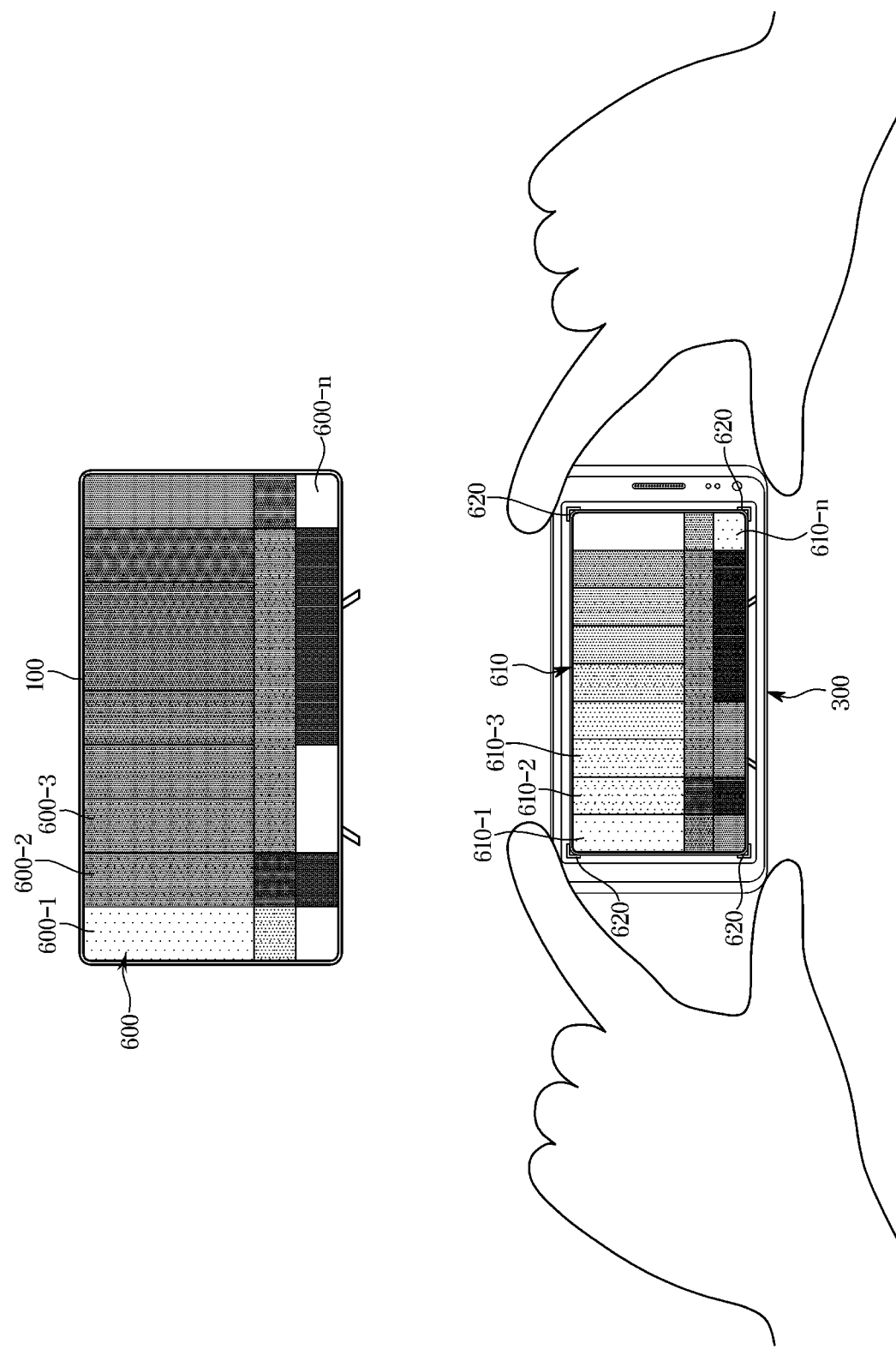
FIG. 18 shows an example of photographing a screen of a display apparatus by using a user apparatus according to an embodiment.

FIG. 17 shows an example of an operation for correcting an image quality change caused by long-term use of the display apparatus according to an embodiment. FIG. 18 shows an example of photographing a screen of the display apparatus by using a user apparatus according to an embodiment.

Hereinafter, an operation 1300 for correcting an image quality change of the display apparatus 100 caused by long-term use of the display apparatus 100 will be described with reference to FIGS. 17 and 18.

The user apparatus 300 may acquire a user input for image correction from a user, in operation 1310.

As a total operating time of the display apparatus 100 elapses after the user purchases the display apparatus 100 increases, image quality of the display apparatus 100 may be gradually degraded.

The user may provide a user input to alleviate degradation in image quality of the display apparatus 100 to the user apparatus 300. For example, the user apparatus 100 may display a picture setting screen for a picture setting of the display apparatus 100 on the touch screen 330, and the user may provide a user input for correcting an image quality change caused by long-term use of the display apparatus 100 by providing the user input to the touch screen 330.

The controller 340 of the user apparatus 300 may acquire the user input for image correction from the user through the touch screen 330.

The user apparatus 300 may transmit the user input for image correction to the display apparatus 100, in operation 1320.

The controller 340 of the user apparatus 300 may control the communicator 310 to transmit the user input for image correction to the display apparatus 100. The display apparatus 100 may receive the user input for image correction through the communicator 170.

The display apparatus 100 may display an image 600 for image correction, in operation 1330.

By receiving the user input for image correction, the controller 190 of the display apparatus 100 may control the image display 150 to display the image 600 for image correction.

The image 600 for image correction may include a plurality of areas, that is, first to n-th areas 600-1, 600-2, 600-3, . . . , 600-n. The plurality of areas 600-1, 600-2, 600-3, . . . , 600-n may have different colors, different brightness levels, and different color densities. For example, as shown in FIG. 18, the first area 600-1 may display a white color, the second area 600-2 may display a yellow color, and the third area 600-3 may display a blue green color. Also, the n-th area 600-n may display a black color.

The display apparatus 100 may transmit a response signal to the user apparatus 300, in operation 1340.

The controller 190 of the display apparatus 100 may control the communicator 170 to transmit a response signal indicating that the image 600 for image correction has been displayed to the user apparatus 300. The user apparatus 300 may receive the response signal of the display apparatus 100 through the communicator 310.

The user apparatus 300 may photograph a screen S of the display apparatus 100, in operation 1350.

By receiving the response signal of the display apparatus 100, the controller 340 of the user apparatus 300 may control the camera 320 to acquire an image.

Also, the controller 340 may control the touch screen 330 to display the image acquired by the camera 320. For example, as shown in FIG. 18, the touch screen 330 may display a photographed image 610 of the screen S of the display apparatus 100, acquired by the camera 320. Also, the touch screen 330 may display a plurality of guide lines 620 for guiding a location of the photographed image 610 of the screen S of the display apparatus 100.

The user may adjust a location and/direction of the user apparatus 300 such that the photographed image 610 of the screen S of the display apparatus 100 is positioned within a boundary defined by the plurality of guide lines 620.

When the user adjusts the location and/or direction of the user apparatus 300, the controller 340 may determine whether the photographed image 610 of the screen S is positioned at a predetermined location in an image acquired by the camera 320. In other words, the controller 340 may determine whether the photographed image 610 of the screen S is positioned within the boundary of the guide lines 620.

For example, the controller 340 may detect edges of the photographed image 610 of the screen S of the display apparatus 100 by using an edge detection algorithm, and determine whether the detected edges are positioned within the boundary of the guide lines 620. When the detected edges are positioned inside the guide lines 620, the controller 340 may determine whether partition lines partitioning the plurality of areas 600-1, 600-2, 600-3, . . . , 600-$n$ included in the image 600 for image correction exist in the detected edges. When the controller 340 determines that the partition lines exist in the detected edges, the controller 340 may determine that the photographed image 610 of the screen S of the display apparatus 100 is positioned within the boundary of the guide lines 620.

When the photographed image 610 representing the screen S of the display apparatus 100 is positioned in a predetermined location, the controller 340 may control the camera 320 to record an image acquired by the camera 320. In other words, the controller 340 may control the camera 320 to photograph the screen S of the display apparatus 100.

The user apparatus 300 may transmit the photographed image 610 obtained by photographing the screen S of the display apparatus 100 to the display apparatus 100, in operation 1360.

The controller 340 of the user apparatus 300 may control the communicator 310 to transmit the photographed image 610 of the screen S to the display apparatus 100. The display apparatus 100 may receive the photographed image 610 of the screen S through the communicator 170.

The display apparatus 100 may transmit a request for a parameter for image correction of the display apparatus 100 to the service apparatus 200, in operation 1370.

The controller 190 of the display apparatus 100 may control the communicator 170 to transmit a message for requesting an image parameter and a driving parameter for image correction of the display apparatus 100 to the service apparatus 200. Also, the controller 190 may control the communicator 170 to transmit the photographed image 610 of the screen S together with the message for requesting the image parameter and the driving parameter to the service apparatus 200. In addition, the display apparatus 100 may selectively transmit operation information and environment information of the display apparatus 100 together with the photographed image 610 of the screen S to the service apparatus 200.

The communication interface 210 of the service apparatus 200 may receive the message for requesting the image parameter and the driving parameter and the photographed image 610 of the screen S from the display apparatus 100.

The service apparatus 200 may acquire a parameter for image correction of the display apparatus 100, in operation 1380.

The processor 240 of the service apparatus 200 may process the photographed image 610 of the screen S of the display apparatus 100, in response to the message for requesting the image parameter and the driving parameter, received from the display apparatus 100.

For example, the information inputter 220 may acquire the photographed image 610 of the screen S through the communication interface 210. The information inputter 220 may extract information about a color, a brightness level, and a color density at a predetermined location from the photographed image 610 of the screen S. The information inputter 220 may extract information about a color, a brightness level, and a color density of each of the plurality of areas 610-1, 610-2, 610-3, . . . , 610-$n$ included in the photographed image 610 of the screen S. The color, the brightness level, and the color density of each of the plurality of areas 610-1, 610-2, 610-3, . . . , 610-$n$ included in the photographed image 610 of the screen S may be substantially the same as a color, a brightness level, and a color density of the corresponding one of the plurality of areas 600-1, 600-2, 600-3, . . . , 600-$n$ of the image 600 for image correction displayed on the display apparatus 100. The information inputter 220 may transfer the extracted information about the color, brightness level, and color density to the processor 240.

The processor 240 may provide the information about the color, brightness level, and color density to the database 230 to search for information about a brightness reduction and/or color change of the display apparatus 100. The database 230 may include information about a brightness reduction and/or a color change of the display apparatus 100 corresponding to the color, brightness level, and color density of the image 600 for image correction that is displayed on the display apparatus 100. The processor 240 may acquire the information about the brightness reduction and/or color change of the display apparatus 100 from the database 230.

The processor 240 may use the information about the brightness reduction and/or color change of the display apparatus 100 to search the database 230 to obtain an image parameter and a driving parameter corresponding to the brightness reduction and/or color change of the display apparatus 100. The database 230 may include image parameters and driving parameters for correcting various brightness reductions and various color changes of display apparatuses. The processor 240 may acquire the image parameter and the driving parameter for correcting the brightness reduction and/or color change of the display apparatus 100 from the database 230.

The parameter outputter 250 may receive the image parameter and the driving parameter for the display apparatus 100 from the processor 240, and generate update data for updating an image parameter and a driving parameter of the display apparatus 100.

The service apparatus 200 may transmit the update data of the display apparatus 100 to the display apparatus 100, in operation 1390.

The communication interface 210 of the service apparatus 200 may transmit the update data for updating the image parameter and the driving parameter to the display apparatus 100.

The display apparatus 100 may update the image parameter and the driving parameter, in operation 1395.

The controller 190 may update the image parameter and the driving parameter by using the update data received from the service apparatus 200. The controller 190 may extract an image parameter and a driving parameter from the update data, and store the extracted image parameter and the driving parameter in the memory 192.

As such, the display apparatus 100 may correct an image quality change in response to a user input received through the user apparatus 300. However, conditions that are used by the display apparatus 100 to correct an image quality change is not limited thereto. For example, the display apparatus 100 may acquire a user input through the user inputter 130 or the remote controller 130a, and correct an image quality change in response to the user input.

Figure 19:
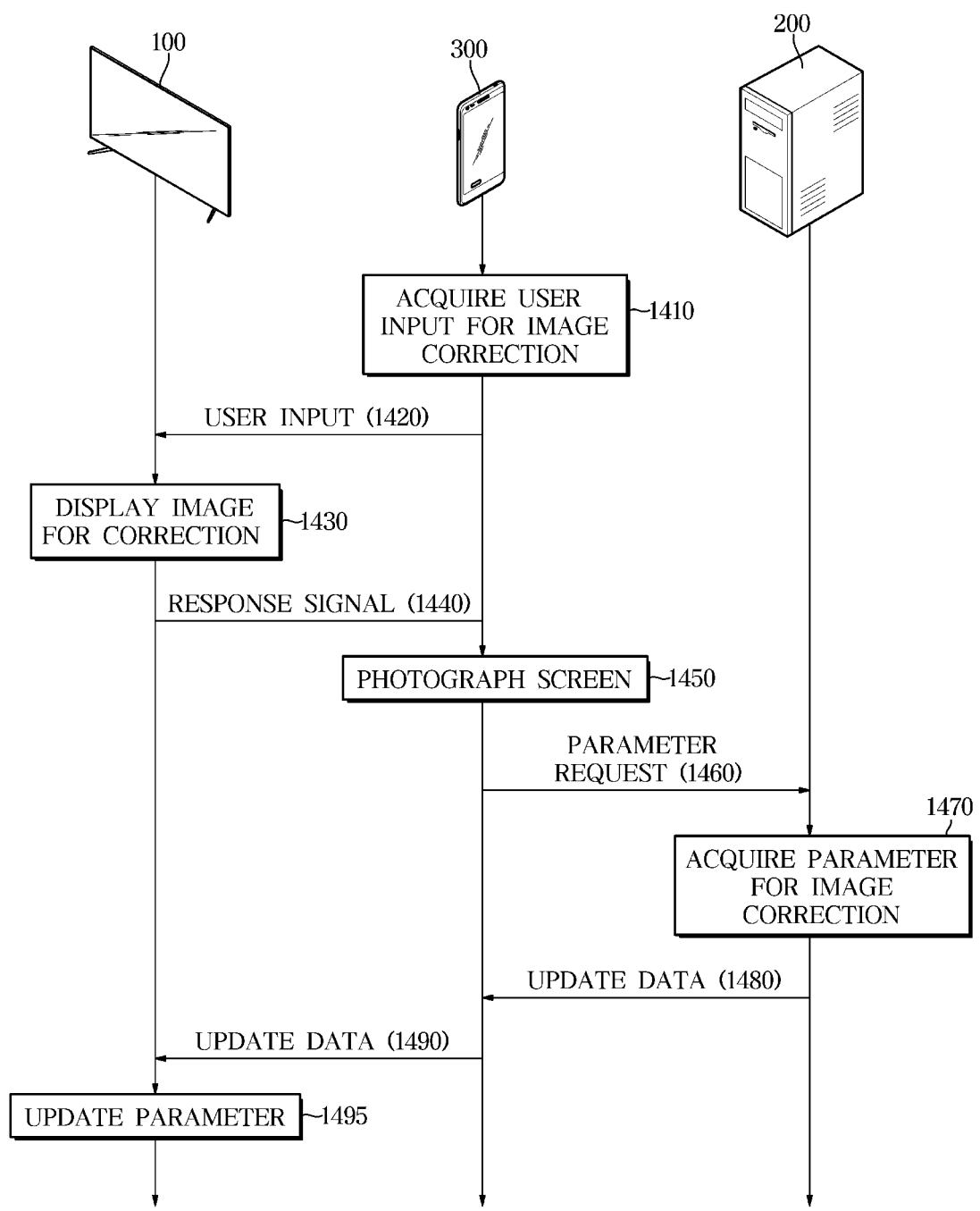
FIG. 19 shows another example of an operation for correcting an image quality change caused by long-term use of a display apparatus according to an embodiment.
Figure 20:
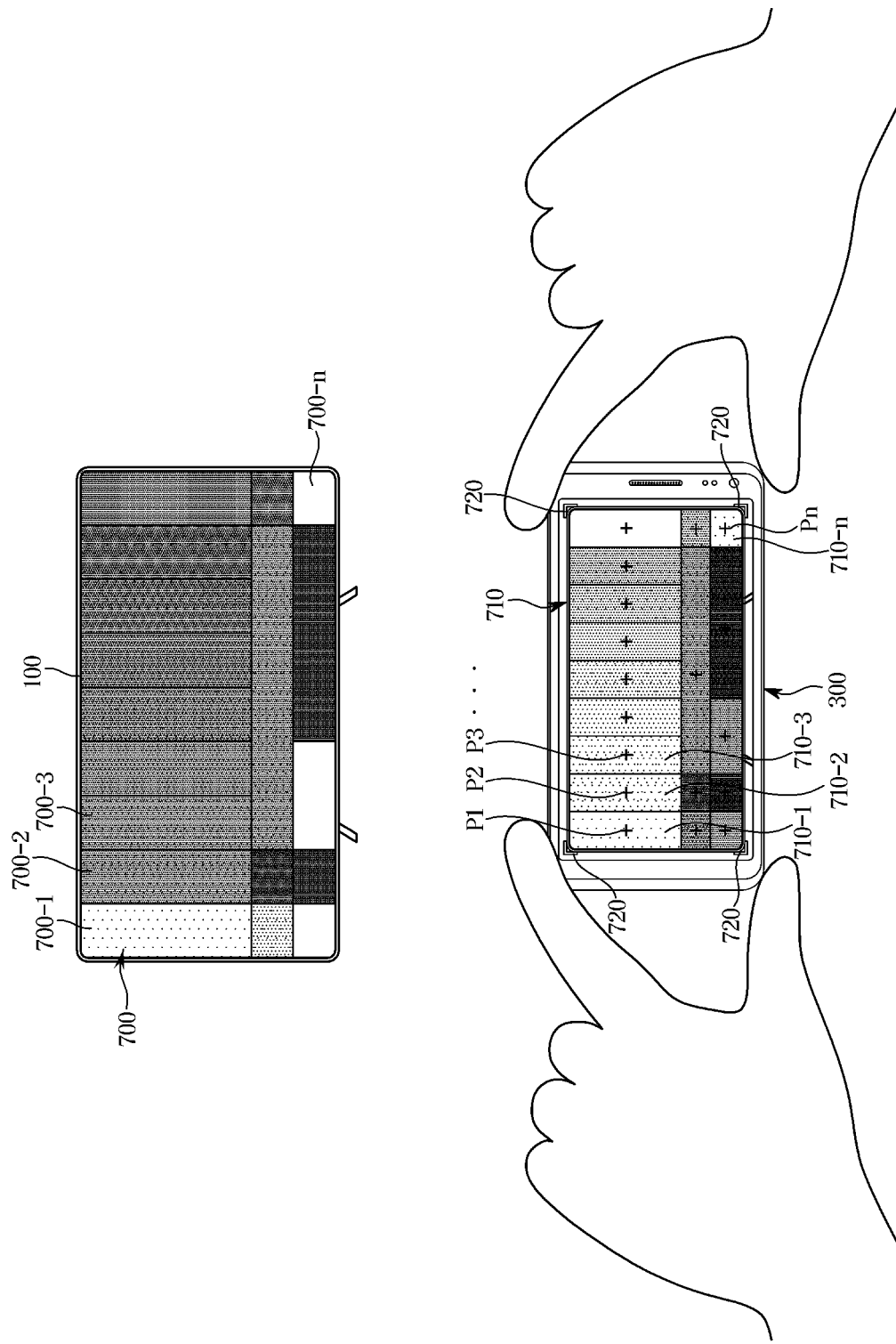
FIG. 20 shows another example of photographing a screen of a display apparatus by using a user apparatus according to an embodiment.

FIG. 19 shows another example of an operation for correcting an image quality change caused by long-term use of the display apparatus according to an embodiment. FIG. 20 shows another example of photographing a screen of the display apparatus by using a user apparatus according to an embodiment.

Hereinafter, an operation 1400 for correcting an image quality change of the display apparatus 100, caused by long-term use of the display apparatus 100, will be described with reference to FIGS. 19 and 20.

The user apparatus 300 may acquire a user input for image correction from a user, in operation 1410. The user apparatus 300 may transmit the user input for image correction to the display apparatus 100, in operation 1420. The display apparatus 100 may display an image for image correction, in operation 1430. Then, the display apparatus 100 may transmit a response signal to the user apparatus 300, in operation 1440.

Operations 1410, 1420, 1430, and 1440 may be the same as operations 1310, 1320, 1330, and 1340 shown in FIG. 17, respectively. The display apparatus 100 may display an image 700 for image correction including a plurality of areas 700-1, 700-2, 700-3, . . . , 700-n, wherein the plurality of areas 700-1, 700-2, 700-3, . . . , 700-n may have different brightness levels and different color densities.

The user apparatus 300 may photograph a screen S of the display apparatus 100, in operation 1450.

By receiving the response signal from the display apparatus 100, the controller 340 of the user apparatus 300 may control the camera 320 to acquire an image. When the image 700 displayed on the screen S of the display apparatus 100 is positioned within a boundary of a plurality of guide lines 720, the controller 340 may control the camera 320 to record an image acquired by the camera 320. In other words, the controller 340 may control the camera 320 to photograph the screen S of the display apparatus 100.

The controller 340 may analyze a photographed image 710 obtained by photographing the screen S. The controller 340 may extract information about colors, brightness levels, color densities of predetermined locations P1, P2, P3, . . . , Pn in the photographed image 710 of the screen S, as shown in FIG. 20. The controller 340 may extract information about a color, a brightness level, and a color density of each of the areas 710-1, 710-2, 710-3, . . . , 710-n included in the photographed image 710 of the screen S.

The user apparatus 300 may transmit a request for a parameter for image correction of the display apparatus 100 to the service apparatus 200, in operation 1460.

The controller 340 of the user apparatus 300 may control the communicator 310 to transmit a message for requesting an image parameter and a driving parameter for image correction of the display apparatus 100 to the service apparatus 200. Also, the controller 340 may control the communicator 310 to transmit the information about the colors, brightness levels, and color densities of the photographed image 710 of the screen S, together with the message for requesting the image parameter and the driving parameter.

The communication interface 210 of the service apparatus 200 may receive the message for requesting the image parameter and the driving parameter and the information about the colors, brightness levels, and color densities of the photographed image 710 of the screen S from the user apparatus 300.

The service apparatus 200 may acquire a parameter for image correction of the display apparatus 100, in operation 1470.

The processor 240 may use the information about the colors, brightness levels, and color densities of the photographed image 710 of the screen S to search the database 230 to obtain an image parameter and a driving parameter for correcting a brightness reduction and/or color change of the display apparatus 100. The processor 240 may acquire the image parameter and the driving parameter for correcting the brightness reduction and/or color change of the display apparatus 100 from the database 230.

The parameter outputter 250 may generate update data for updating an image parameter and a driving parameter of the display apparatus 100.

The service apparatus 200 may transmit the update data of the display apparatus 100 to the user apparatus 300, in operation 1480, and the user apparatus 300 may transmit the update data of the display apparatus 100 to the display apparatus 100, in operation 1490.

The display apparatus 100 may update the image parameter and the driving parameter, in operation 1495.

The operation 1495 may be the same as the operation 1395 shown in FIG. 17.

As described above, the user apparatus 300 may photograph a predetermined image displayed on the display apparatus 100, and the service apparatus 200 may generate a parameter for correcting an image quality change of the display apparatus 100 based on the photographed image. Therefore, the display apparatus 100 may provide an optimal image quality to the user.

According to one aspect of the disclosure, there may be provided the display apparatus capable of correcting an image quality change caused by long-time use.

According to another aspect of the disclosure, there may be provided the display apparatus capable of correcting both a change of an image caused by long-time use and a change of an image caused by short-time use.

According to another aspect of the disclosure, there may be provided the display apparatus capable of measuring a change of a displayed image, and correcting the change of the image based on the measured change of the image.

Embodiments of the disclosure have been described above. In the embodiments described above, some components may be implemented as a "module." Here, the term "module" may mean, but is not limited to, a software and/or hardware component, such as a Field Programmable Gate Array (FPGA) or Application Specific Integrated Circuit (ASIC), which may perform certain tasks. A module may advantageously be configured to reside on the addressable storage medium and may be configured to be executed on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

In addition to the embodiments described above, embodiments may be implemented through computer readable code/instructions in/on a medium, e.g., a computer readable medium, to control at least one processing element to implement any of the embodiments described above. The medium may correspond to any medium/media permitting the storing and/or transmission of the computer readable code.

The computer-readable code may be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code may be stored or transferred and executed in a distributed fashion. Still further, as an example, the processing element may include at least one processor or at least one computer processor, and processing elements may be distributed and/or included in a single device.

While embodiments have been described in a limited manner, those skilled in the art, having the benefit of this disclosure, will appreciate that other embodiments may be derived without departing from the scope of the disclosure.

What is claimed is:

1. A mobile device comprising:
    a sensor;
    a communicator; and
    a processor configured to:
    control the communicator to transmit, to an external display apparatus, a first communication signal for displaying predetermined images, the predetermined images including at least one from among first images with different colors, second images with different brightness levels, or third images with different color densities,
    control the sensor to acquire the predetermined images displayed on the external display apparatus,
    control the communicator to transmit, to an external server, a second communication signal for requesting data for an image correction of the external display apparatus, the data for the image correction being based on the acquired predetermined images,
    receive the data for image correction of the external display apparatus from the external server through the communicator, and
    control the communicator to transmit the data for the image correction of the external display apparatus to the external display apparatus, the data for image correction corresponding to information of the acquired predetermined images.

2. The mobile device of claim 1, further comprising a touch screen,
    wherein the processor is further configured to control the communicator to transmit the first communication signal, based on receiving a user input signal from the touch screen.

3. The mobile device of claim 1, wherein an image parameter of the external display apparatus is updated based on the data for the image correction.

4. The mobile device of claim 3, wherein the image parameter comprises at least one from among a brightness level, a contrast, a sharpness level, and a color density of the external display apparatus.

5. The mobile device of claim 1, wherein the processor is further configured to control the communicator to transmit the second communication signal including information regarding the acquired predetermined images.

6. The mobile device of claim 5, wherein the information regarding the acquired predetermined images comprises at least one from among a color, a brightness level, and a color density of the acquired predetermined images.

7. The mobile device of claim 1, wherein the processor is further configured to receive, from the external display apparatus, a response signal responding to a user input for requesting the image correction and control the sensor to acquire the predetermined images based on the response signal being received from the external display apparatus.

8. A display apparatus comprising:
    a display;
    a communicator; and
    a processor configured to:
    receive a first communication signal for an image correction from a mobile device through the communicator,
    control the display to display predetermined images based on receiving the first communication signal, the predetermined images including at least one from among first images with different colors, second images with different brightness levels, or third images with different color densities,
    receive a second communication signal including data for the image correction from the mobile device through the communicator,
    receive the data for the image correction from a server through the communicator,
    perform an image correction based on the data for the image correction, the data being based on the predetermined images acquired by the mobile device, and
    control the display to display an image corrected based on the data for the image correction.

9. The display apparatus of claim 8, wherein the processor is further configured to:
    based on receiving the data for the image correction, update an image parameter based on the data for the image correction.

10. The display apparatus of claim 9, wherein the image parameter comprises at least one from among a brightness level, a contrast, a sharpness level, and a color density of the display apparatus.

11. The display apparatus of claim 8, further comprising a user inputter configured to acquire a user input;
    wherein the processor is further configured to transmit, to the mobile device, a response signal responding to the user input for requesting the image correction so that the mobile device acquires the predetermined images based on the response signal being received by the mobile device.

\* \* \* \* \*